(12) United States Patent
Zhang et al.

(10) Patent No.: US 12,368,562 B2
(45) Date of Patent: *Jul. 22, 2025

(54) SPATIAL RELATION PARAMETER SELECTION METHOD, APPARATUS, AND DEVICE

(71) Applicant: HUAWEI TECHNOLOGIES CO., LTD., Guangdong (CN)

(72) Inventors: Di Zhang, Shenzhen (CN); Kunpeng Liu, Beijing (CN); Xianda Liu, Beijing (CN); Xiang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,438

(22) Filed: Dec. 29, 2023

(65) Prior Publication Data

US 2024/0204956 A1 Jun. 20, 2024

Related U.S. Application Data

(63) Continuation of application No. 17/245,091, filed on Apr. 30, 2021, now Pat. No. 11,895,054, which is a
(Continued)

(30) Foreign Application Priority Data

Nov. 2, 2018 (CN) .......................... 201811303305.4

(51) Int. Cl.
*H04L 5/00* (2006.01)
*H04B 7/0408* (2017.01)
(Continued)

(52) U.S. Cl.
CPC ......... *H04L 5/0053* (2013.01); *H04B 7/0408* (2013.01); *H04L 5/0023* (2013.01);
(Continued)

(58) Field of Classification Search
CPC ................ H04L 5/0053; H04L 5/0023; H04B 7/0408; H04W 72/046; H04W 72/23
See application file for complete search history.

(56) References Cited

U.S. PATENT DOCUMENTS 11,451,414 B2 9/2022 Jiang et al.
11,974,305 B2 * 4/2024 Yang ................... H04W 72/046
(Continued)

FOREIGN PATENT DOCUMENTS

CN 108012299 A 5/2018
CN 108111272 A 6/2018
(Continued)

OTHER PUBLICATIONS

3GPP TSG RAN WG1 Meeting #94bis,R1-1810435,Enhancements on multi-beam operation, MediaTek Inc,Chengdu, China, Oct. 8-12, 2018, total 8 pages.
(Continued)

*Primary Examiner* — Chandrahas B Patel
(74) *Attorney, Agent, or Firm* — WOMBLE BOND DICKINSON (US) LLP

(57) ABSTRACT

An information transmission method, an apparatus, and a device are disclosed. The method includes: A terminal receives first signaling, where the first signaling includes a first field, a state value of the first field is used to indicate a first spatial relation parameter for receiving a first channel, the state value of the first field is one of a plurality of candidate state values corresponding to the first field, and at least one of the plurality of candidate state values corresponds to two or more spatial relation parameters. The terminal obtains one or more target spatial relation parameters in the first spatial relation parameter, and receives the first channel based on the one or more target spatial relation parameters.

20 Claims, 9 Drawing Sheets

Related U.S. Application Data continuation of application No. PCT/CN2019/114613, filed on Oct. 31, 2019.

(51) Int. Cl.
*H04W 72/044* (2023.01)
*H04B 7/06* (2006.01)
*H04W 72/23* (2023.01)

(52) U.S. Cl.
CPC ......... *H04L 5/0091* (2013.01); *H04W 72/046* (2013.01); *H04B 7/0632* (2013.01); *H04W 72/23* (2023.01)

(56) References Cited

U.S. PATENT DOCUMENTS

| | | | |
|---|---|---|---|
| 2018/0288755 A1 | 10/2018 | Liu et al. | |
| 2020/0186393 A1 | 6/2020 | Wang et al. | |
| 2021/0344386 A1* | 11/2021 | Grant | H04W 72/21 |

FOREIGN PATENT DOCUMENTS

| | | |
|---|---|---|
| CN | 108199819 A | 6/2018 |
| CN | 108632838 A | 10/2018 |
| EP | 3761549 A1 | 1/2021 |

OTHER PUBLICATIONS

3GPP TSG RAN WG1 Meeting #97,R1-1906037,Single PDCCH based multi-TRP/panel transmission,Huawei, HiSilicon,Reno, USA, May 13-17, 2019,total 15 pages.

3GPP TSG RAN WG1 Meeting #94,R1-1809117,Enhancements on multi-TRP/panel transmission in NR,Huawei, HiSilicon,Gothenburg, Sweden, Aug. 20-24, 2018,total 10 pages.

3GPP TSG-RAN WG1 Meeting #94bis,R1-1811277,Enhancements on Multi-TRP/Panel Transmission,Qualcomm Incorporated,Oct. 8-12, 2018 Chengdu, China,total 12 pages.

Samsung, On Beam Management, Measurement and Reporting. 3GPP TSG RAN WG1 Meeting 90bis, Prague, CZ, Oct. 9-13, 2017, R1-1717605, 16 pages.

* cited by examiner

| Antenna port value | Number of DMRS CDM groups | DMRS port number |
| --- | --- | --- |
| Antenna port value | Number of DMRS CDM group | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0–2 |
| 10 | 2 | 0–3 |
| 11 | 2 | 0, 2 |
| 12–15 | Reserved | Reserved |

| A quantity of codewords is 1 | | | A quantity of codewords is 2 | | |
|---|---|---|---|---|---|
| Value | DMRS port number | Quantity of front symbols | Value | DMRS port number | Quantity of front symbols |
| 0 | 0 | 1 | 0 | 0-4 | 2 |
| 1 | 1 | 1 | 1 | 0-4, 6 | 2 |
| 2 | 0, 1 | 1 | 2 | 0-6 | 2 |
| 3 | 0 | 1 | 3 | 0-7 | 2 |
| 4 | 1 | 1 | 4-31 | Reserved | Reserved |
| 5 | 2 | 1 | | | |
| 6 | 3 | 1 | | | |
| 7 | 0, 1 | 1 | | | |
| 8 | 2, 3 | 1 | | | |
| 9 | 0-2 | 1 | | | |
| 10 | 0-3 | 1 | | | |
| 11 | 0, 2 | 1 | | | |
| 12 | 0 | | | | |
| ... | ... | ... | | | |
| 29 | 2, 3, 6, 7 | 2 | | | |
| 30 | 0, 2, 4, 6 | 2 | | | |
| 31 | Reserved | Reserved | | | |

FIG. 8

SPATIAL RELATION PARAMETER SELECTION METHOD, APPARATUS, AND DEVICE

CROSS-REFERENCE TO RELATED APPLICATIONS

This application is a continuation of U.S. patent application Ser. No. 17/245,091, filed on Apr. 30, 2021, which is a continuation of International Application No. PCT/CN2019/114613, filed on Oct. 31, 2019. The International Application claims priority to Chinese Patent Application No. 201811303305.4, filed on Nov. 2, 2018. All of the aforementioned patent applications are hereby incorporated by reference in their entireties.

TECHNICAL FIELD

This application relates to the communications field, and in particular, to an information transmission method, an apparatus, and a device.

BACKGROUND

With emergence of video services on intelligent terminals, current spectrum resources cannot meet an explosive growth of capacity requirements of users. A high frequency band with higher available bandwidth, such as a millimeter-wave band, increasingly becomes a candidate frequency band of a next-generation communications system. In another aspect, a multiple-input multiple-output technology is usually used in modern communications systems to improve a system capacity and coverage, so as to improve user experience. In addition, using a high frequency band can further greatly reduce a size for configuring a plurality of antennas, thereby facilitating site address obtaining and deployment of more antennas. However, different from an operating frequency band of an existing long term evolution (LTE) system, a high frequency band causes a larger path loss, and in particular, impact of factors such as atmosphere and vegetation further increases a radio propagation loss.

To cope with a propagation loss caused by a high frequency band, a signal transmission mechanism based on a beamforming (BF) technology is used to compensate for a loss in a signal propagation process by using a comparatively large antenna gain. Beamforming signals may include a broadcast signal, a synchronization signal, a cell-specific reference signal, and the like.

When a signal is transmitted based on the beamforming technology, once a user moves, a direction of a formed beam corresponding to the transmitted signal may no longer match a location of the user after the user moves, thereby causing frequent interruption of a received signal. To track changes in the formed beam during signal transmission, channel quality measurement and result reporting based on the beamforming technology are introduced. The channel quality measurement may be implemented based on a synchronization signal or a cell-specific reference signal obtained through beamforming. Compared with inter-cell handovers, handovers of a user between different formed beams are more dynamic and frequent. Therefore, a dynamic measurement and reporting mechanism is required.

Specifically, a terminal measures a plurality of beams sent by a base station, selects N better beams from the plurality of beams, and then reports beam measurement information of the better beams to the base station. The beam measurement information may also be referred to as beam state information (BSI), and content mainly includes a beam index and a reference signal received power (RSRP) of a beam. FIG. 1 (e) shows a training process of beams sent by a base station. On the contrary, as shown in FIG. 1 (d), UE sends a plurality of beams, and a base station measures the plurality of beams sent by the UE, and notifies the UE of a better beam in the plurality of beams sent by the UE. Generally, a beam on a transmit side of a base station is represented by a reference signal resource in a standard. For example, a beam index 1 may be described as a reference signal resource index 1 in the standard. A received beam on a terminal side is indicated by using a spatial receive parameter in quasi-co-site or quasi-colocation assumption information, and beam state information may be described as L1-RSRP related information.

A beam training process shown in FIG. 1 may include the following operations.

(1) Select N optimal beam pair links (BPL), where one BPL includes one transmit beam of a network device and one receive beam of a terminal (or a terminal device), or one BPL includes one transmit beam of a terminal and one receive beam of a network device. This operation is used for the terminal to select a transmit beam of the network device and/or a receive beam of the terminal based on beam sweeping of the network device, and used for the network device to select a transmit beam of the terminal and/or a receive beam of a base station based on beam sweeping of the terminal, that is, a downlink joint beam training process shown in FIG. 1 (a) and an uplink joint beam training process shown in FIG. 1 (b).

(2) Update a transmit beam. The transmit beam may be a transmit beam of the network device, or may be a transmit beam of the terminal. When the transmit beam is a transmit beam of the network device, in a downlink beam training process of the network device shown in FIG. 1 (e), the network device sends reference signals to the terminal by using different transmit beams. The terminal receives, by using one receive beam, the reference signals sent by the network device by using different transmit beams, and determines an optimal transmit beam of the network device based on the received reference signals. Then the terminal feeds back the optimal transmit beam to the network device, so that the network device updates the transmit beam.

Similarly, when the transmit beam is a transmit beam of the terminal, in an uplink beam training process of the terminal shown in FIG. 1 (d), the terminal sends reference signals to the network device by using different transmit beams. The network device receives, by using one receive beam, the reference signals sent by the terminal by using different transmit beams, and determines an optimal transmit beam of the terminal based on the received signals. Then the network device feeds back the optimal transmit beam to the terminal, so that the terminal updates the transmit beam. The process of sending the reference signals by using different transmit beams may be referred to as beam sweeping, and the process of determining the optimal transmit beam based on the received signals may be referred to as beam matching.

(3) Update a receive beam. The receive beam may be a receive beam of the network device, or may be a receive beam of the terminal. When the receive beam is a receive beam of the network device, in an uplink beam training process of the network device shown in FIG. 1 (f), the terminal sends references signal to the network device by using one transmit beam. The network device receives, by using different receive beams, the reference signals sent by the terminal, and then determines an optimal receive beam of the network device based on the received signals, to update the receive beam of the network device. When the receive beam is a receive beam of the terminal, in a downlink beam training process of the terminal shown in FIG. 1 (c), the network device sends reference signals to the terminal by using one transmit beam. The terminal receives, by using different receive beams, the reference signals sent by the network device, and then determines an optimal receive beam of the terminal based on the received signals, to update the receive beam of the terminal.

During transmission of a downlink signal, both a transmit beam of a network device and a receive beam of a terminal may dynamically change, and a plurality of optimal receive beams may be determined by the terminal based on received signals. To enable the terminal to determine a receive beam of the terminal, the terminal may feed back information about a plurality of receive beams to the network device, and the network device may indicate a receive beam of the terminal to the terminal by sending beam indication information to the terminal. When analog domain beamforming is used for the terminal, the terminal may accurately determine the receive beam of the terminal based on the beam indication information sent by the network device, thereby reducing a beam sweeping time of the terminal device, and achieving a power saving effect.

In the current beam indication method, only a transmission mode in which one beam is used to communicate with the terminal at a specific moment when there is only one transmission reception point (TRP) is considered. However, a new-generation communications system such as new radio (NR) can support a network device in communicating with one terminal by simultaneously using different beams, that is, multi-beam transmission, or can support a plurality of TRPs in serving a terminal. That a plurality of TRPs communicate with one terminal includes: The plurality of TRPs simultaneously communicate with the terminal, or the plurality of TRPs communicate with the terminal through dynamic point selection (DPS). A scenario in which a plurality of TRPs simultaneously communicate with one terminal may also be referred to as a non-coherent joint transmission (NCJT) scenario or an NCJT transmission mode.

An existing protocol cannot support QCL information indication in the foregoing scenarios or transmission modes. Therefore, in a multi-beam, multi-link, or multi-layer transmission scenario or a multi-TRP transmission scenario, a corresponding mechanism needs to be introduced to indicate QCL information of a data channel.

SUMMARY

This application provides an information transmission method, an apparatus, and a device, to cope with an issue of determining a PDSCH transmit beam by a terminal device in different transmission modes, for example, in a multi-beam, multi-link, or multi-layer transmission scenario or a multi-TRP transmission scenario.

According to a first aspect, this application provides an information transmission method. The method includes: receiving first signaling, where the first signaling includes a first field, a state value of the first field is used to indicate a first spatial relation parameter for receiving a first channel, the state value of the first field is one of a plurality of candidate state values corresponding to the first field, and at least one of the plurality of candidate state values corresponds to two or more spatial relation parameters; obtaining one or more target spatial relation parameters in the first spatial relation parameter; and receiving the first channel based on the one or more target spatial relation parameters.

In an embodiment, the spatial relation parameter may be a TCI state ID, quasi-colocation QCL information, or a reference signal. The reference signal and the first channel meet a QCL relationship, or the reference signal and a DMRS of the first channel meet a QCL relationship.

In an embodiment, before the receiving first signaling, the method further includes: receiving second signaling, where the second signaling is used to configure M spatial relation parameter sets, and $M \geq 1$. The $i^{th}$ spatial relation parameter set of the M spatial relation parameter sets includes Li spatial relation parameters, there is a correspondence between each of the Li spatial relation parameters and a candidate state value of the first field, $1 \leq i \leq M$, $Li \geq 2$, and M, i, and Li are all integers.

In an embodiment, the obtaining one or more target spatial relation parameters in the first spatial relation parameter includes: determining the one or more target spatial relation parameters in the first spatial relation parameter based on first information, where the first information is at least one of the following: at least one second field in the first signaling, an identifier of a control resource set to which the first signaling belongs, an identifier of a search space set to which the first signaling belongs, and an antenna panel identifier.

It should be understood that, in this application, the first information may be alternatively other information, for example, transmission mode indication information. Any manner obtained through simple extension or simple combination falls within the protection scope of this application.

In an embodiment, the first information may be alternatively the state value of the first field.

In an embodiment, the second field is a transport block field or an antenna port field. Further, the transport block field is used to indicate a quantity of codewords, and the antenna port field is used to indicate at least one DMRS port number.

In an embodiment, the determining the one or more target spatial relation parameters in the first spatial relation parameter based on first information includes: determining the one or more target spatial relation parameters in the first spatial relation parameter based on second information and the first information, where the second information is carried in third signaling, and the second information is used to configure a correspondence between the first information and the one or more target spatial relation parameters.

In an embodiment, the second information may be alternatively predefined in a protocol.

In an embodiment, a correspondence between the one or more spatial relation parameters and a value of the first information and/or a value of information indicated by the first information includes any one of the following: a correspondence between the one or more spatial relation parameters and a demodulation reference signal DMRS port identifier indicated by the at least one second field in the first signaling; a correspondence between the one or more target spatial relation parameters and an identifier that is indicated by the at least one second field in the first signaling and that is of a group to which a DMRS port belongs; a correspondence between the one or more target spatial relation parameters and codeword information indicated by the at least one second field in the first signaling; a correspondence between the one or more target spatial relation parameters and the identifier of the control resource set to which the first signaling belongs; a correspondence between the one or more target spatial relation parameters and the identifier of the search space set to which the first signaling belongs; and a correspondence between the one or more target spatial relation parameters and the antenna panel identifier.

In an embodiment, the M spatial relation parameter sets include P second spatial relation parameters and Q third spatial relation parameters, there is a correspondence between the P second spatial relation parameters and a first value, and there is a correspondence between the Q third spatial relation parameters and a second value.

The first value and the second value are any one of the following: the DMRS port number, the identifier of the group to which the DMRS port belongs, or the codeword information that is indicated by the second field; the identifier of the control resource set; and the identifier of the search space set or the antenna panel identifier. The DMRS port number indicated by the second field may be indicated by the antenna port field.

In an embodiment, the codeword information includes the quantity of codewords.

In an embodiment, at least one of the M spatial relation parameter sets includes the P second spatial relation parameters, and at least one of the M spatial relation parameter sets includes the Q third spatial relation parameters; or at least one of the M spatial relation parameter sets includes the P second spatial relation parameters and the Q third spatial relation parameters.

In an embodiment, the first spatial relation parameter includes a second spatial relation parameter and a third spatial relation parameter, and the value of the first information and/or the value of the information indicated by the first information include/includes at least one value.

The determining the one or more target spatial relation parameters in the first spatial relation parameter based on first information includes: When the value of the first information and/or the value of the information indicated by the first information are/is the first value, the one or more target spatial relation parameters are the second spatial relation parameter; or when the value of the first information and/or the value of the information indicated by the first information are/is the second value, the one or more target spatial relation parameters are the third spatial relation parameter.

In an embodiment, when the value of the first information and/or the value of the information indicated by the first information include/includes the first value and the second value, the one or more target spatial relation parameters include the second spatial relation parameter and the third spatial relation parameter.

In an embodiment, the second field is an antenna port field, and the indicated identifier of the group to which the DMRS port number belongs is a first value 00, or is a second value 01, or includes both the first value 00 and the second value 01. In this case, the one or more target spatial relation parameters may be determined in the following manner: When the identifier of the group to which the DMRS port number belongs is 00, the target spatial relation parameter is the second spatial relation parameter; when the identifier of the group to which the DMRS port number belongs is 01, the target spatial relation parameter is the third spatial relation parameter; or when the identifier of the group to which the DMRS port number belongs includes 00 and 01, the target spatial relation parameter includes the second spatial relation parameter and the third spatial relation parameter, where the second spatial relation parameter is used for a first group with the identifier 00, and the third spatial relation parameter is used for a second group with the identifier 01.

In an embodiment, the at least one second field in the first signaling includes an antenna port field and a transport block field, and the determining the one or more target spatial relation parameters in the first spatial relation parameter based on first information includes: based on the antenna port field and the transport block field in the first signaling and the identifier that is indicated by the antenna port field and that is of the group to which the DMRS port belongs, determining that the one or more target spatial relation parameters include the second spatial relation parameter and/or the third spatial relation parameter.

In an embodiment, the method further includes: When the value of the first information and/or the value of the information indicated by the first information include/includes the first value and the second value, the one or more target spatial relation parameters include the second spatial relation parameter and the third spatial relation parameter.

In an embodiment, the first spatial parameter includes a second spatial parameter and a third spatial relation parameter, and the determining the one or more target spatial relation parameters in the first spatial relation parameter based on first information includes: When the quantity of codewords that is indicated by the second field is 1, the target spatial relation parameter is the second spatial relation parameter or the first spatial relation parameter.

In an embodiment, when the quantity of codewords that is indicated by the second field is 2, the target spatial relation parameter includes the second spatial relation parameter and the third spatial relation parameter; or it is determined, based on a value of the antenna port field, that the target spatial relation parameter is the second spatial relation parameter, or includes the second spatial relation parameter and the third spatial relation parameter; or it is determined, based on the identifier that is indicated by the antenna port field in the first signaling and that is of the group to which the DMRS belongs, that the target spatial relation parameter is the second spatial relation parameter, or includes the second spatial relation parameter and the third spatial relation parameter.

It should be noted that when the first spatial relation parameter includes only one spatial relation parameter, all data is received based on the first spatial relation parameter. For example, when there are two codewords, the first channel is received by using the first spatial relation parameter. When the second spatial relation parameter includes one or more spatial relation parameters, and the third spatial relation parameter includes one or more spatial relation parameters, each spatial relation parameter includes one QCL type or a combination of a plurality of QCL types.

According to the method provided in this embodiment, a terminal receives the first signaling sent by a base station, where the state value of the first field is configured in the first signaling, to indicate a target spatial relation parameter in a plurality of spatial relation parameters, so that the terminal may receive the first channel by using the target spatial relation parameter, to cope with an issue of indicating QCL information of data in a scenario in which one piece of data is scheduled by each of a plurality of pieces of DCI signaling and the data comes from different TRPs, an issue of indicating QCL information of data in a scenario in which data scheduled by one piece of DCI signaling comes from different TRPs, and an issue of indicating QCL information of data in a dynamic point selection transmission scenario.

In addition, in this method, at least one of the plurality of candidate state values of the terminal corresponds to two or more spatial relation parameters. Therefore, compared with an existing method in which one state value corresponds to only one spatial relation parameter, flexibility of TCI information configuration is improved. In addition, an association relationship that one candidate state value corresponds to a plurality of spatial relation parameters is configured, thereby further reducing indication overheads.

In the first aspect, the first spatial relation parameter includes the second spatial relation parameter and the third spatial relation parameter, a state value of the antenna port field includes a first value and a second value, a state value of the transport block field includes a first value and a second value, and information indicated by the antenna port field includes a first value and a second value. The terminal determines the one or more pieces of target spatial relation information based on a value of the transport block field, and/or a value of the antenna port field, and/or a value of the information indicated by the antenna port field.

Specifically, there may be the following several possible manners.

In an embodiment, when the state value of the antenna port field is the first value and the state value of the transport block field is the first value, it is determined that the one or more target spatial relation parameters are the second spatial relation parameter; and/or when the state value of the antenna port field is the second value and the state value of the transport block field is the second value, it is determined that the one or more target spatial relation parameters are the third spatial relation parameter.

In an embodiment, when the state value of the transport block field is the first value, it is determined that the one or more target spatial relation parameters are the second spatial relation parameter; and/or when the state value of the transport block field is the second value and the state value of the antenna port field is the first value, it is determined that the one or more target spatial relation parameters are the second spatial relation parameter; and/or when the state value of the transport block field is the second value and the state value of the antenna port field is the second value, it is determined that the one or more target spatial relation parameters are the third spatial relation parameter.

In an embodiment, the first value of the transport block field indicates that the quantity of codewords is 1. In an embodiment, the second value of the transport block field indicates that the quantity of codewords is 2. In an embodiment, the first value of the antenna port field and/or the first value of the transport block field indicate/indicates a first transmission mode. In an embodiment, the second value of the antenna port field and/or the second value of the transport block field indicate/indicates a second transmission mode. In an embodiment, the first transmission mode is single-TRP transmission. In an embodiment, the second transmission mode is multi-TRP transmission.

For example, the first spatial relation parameter includes a second spatial relation parameter (for example, a TCI a1) and a third spatial relation parameter (for example, TCIs c1 and c9). When the first value of the transport block field indicates that the quantity of codewords is 1, the one or more target spatial relation parameters are the second spatial relation parameter. When the second value of the transport block field indicates that the quantity of codewords is 2, and the first value of the antenna port field is 0 to 3, the one or more target spatial relation parameters are the second spatial relation parameter. When the second value of the transport block field indicates that the quantity of codewords is 2, and the second value of the antenna port field is 4 to 31, the one or more target spatial relation parameters are the third spatial relation parameter.

In an embodiment, when the information indicated by the antenna port field is the first value, it is determined that the one or more target spatial relation parameters are the second spatial relation parameter; and/or when the information indicated by the antenna port field is the second value, it is determined that the one or more target spatial relation parameters are the third spatial relation parameter.

In an embodiment, the first value of the information indicated by the antenna port field indicates that a quantity of DMRS port CDM groups is 1, and the second value of the information indicated by the antenna port field indicates that a quantity of DMRS port CDM groups is greater than 1.

The CDM is code division multiplexing.

For example, the first spatial relation parameter includes a second spatial relation parameter (for example, a TCI a1) and a third spatial relation parameter (for example, TCIs c1 and c9). When the quantity of DMRS port CDM groups that is indicated by the first value of the information indicated by the antenna port field is 1, the target spatial relation parameter is the second spatial relation parameter. When the quantity of DMRS port CDM groups that is indicated by the first value of the information indicated by the antenna port field is greater than 1, the target spatial relation parameter is the third spatial relation parameter.

For another example, the first spatial relation parameter includes a second spatial relation parameter (for example, a TCI c1) and a third spatial relation parameter (for example, a TCI c9). When the quantity of DMRS port CDM groups that is indicated by the first value of the information indicated by the antenna port field is 1, the target spatial relation parameter is the second spatial relation parameter, that is, a DMRS CDM group indicated by the antenna port field corresponds to the TCI c1.

When the quantity of DMRS port CDM groups that is indicated by the first value of the information indicated by the antenna port field is greater than 1, the target spatial relation parameter includes the second spatial relation parameter (for example, the TCI c1) and the third spatial relation parameter (for example, the TCI c9). In this case, a DMRS port in a first DMRS CDM group indicated by the antenna port field corresponds to the TCI c1, and a DMRS port in a DMRS CDM group indicated by the antenna port field other than the first DMRS CDM group corresponds to the TCI c9. For example, if DMRS ports indicated by the antenna port field belong to a DMRS CDM group 00 and a DMRS CDM group 01, a DMRS port that belongs to the DMRS CDM group 00 and that is in the DMRS ports indicated by the antenna port field corresponds to the TCI c1, and a DMRS port that belongs to the DMRS CDM group 01 and that is in the DMRS ports indicated by the antenna port field corresponds to the TCI c9. For another example, if DMRS ports indicated by the antenna port field belong to a DMRS CDM group 00, a DMRS CDM group 01, and a DMRS CDM group 11, a DMRS port that belongs to the DMRS CDM group 00 and that is in the DMRS ports indicated by the antenna port field corresponds to the TCI c1, and DMRS ports that belong to the DMRS CDM group 01 and the DMRS CDM group 11 and that are in the DMRS ports indicated by the antenna port field correspond to the TCI c9.

Further, there are the following manners.

In an embodiment, when the state value of the transport block field is the first value and the information indicated by the antenna port field is the first value, it is determined that the one or more target spatial relation parameters are the second spatial relation parameter; and/or when the state value of the transport block field is the first value and the information indicated by the antenna port field is the second value, it is determined that the one or more target spatial relation parameters are the third spatial relation parameter; and/or when the state value of the transport block field is the second value, the antenna port field is the first value, and the information indicated by the antenna port field is the first value, it is determined that the one or more target spatial relation parameters are the second spatial relation parameter; and/or when the state value of the transport block field is the second value, the antenna port field is the first value, and the information indicated by the antenna port field is the second value, it is determined that the one or more target spatial relation parameters are the third spatial relation parameter; and/or when the state value of the transport block field is the second value, the antenna port field is the second value, and the information indicated by the antenna port field includes the first value and the second value, it is determined that the one or more target spatial relation parameters include the second spatial relation parameter and the third spatial relation parameter.

In an embodiment, the first value of the transport block field indicates that the quantity of codewords is 1. In an embodiment, the second value of the transport block field indicates that the quantity of codewords is 2. In an embodiment, the information indicated by the antenna port field is a DMRS port CDM group identifier.

For example, the first spatial relation parameter includes a second spatial relation parameter (for example, a TCI a1), a third spatial relation parameter (a TCI b1), and a fourth spatial relation parameter (TCIs c1 and c9). When the first value of the transport block field indicates that the quantity of codewords is 1 or the first value indicates that the quantity of codewords is 2, the first value of the antenna port field is 0 to 3, and a value, of a DMRS port CDM group, indicated by the first value of the information indicated by the antenna port field is 00, the target spatial relation parameter is the second spatial relation parameter.

When the first value of the transport block field indicates that the quantity of codewords is 1 or the first value indicates that the quantity of codewords is 2, the first value of the antenna port field is 0 to 3, and a value, of a DMRS port CDM group, indicated by the first value of the information indicated by the antenna port field is 01, the target spatial relation parameter is the third spatial relation parameter.

When the first value indicates that the quantity of codewords is 2, the first value of the antenna port field is 4 to 31, and the second value of the information indicated by the antenna port field indicates that the quantity of DMRS port CDM groups is greater than 1, the one or more target spatial relation parameters include the second spatial relation parameter and the third spatial relation parameter.

In an embodiment, when the state value of the transport block field is the first value, it is determined that the one or more target spatial relation parameters are the second spatial relation parameter; and or when the state value of the transport block field is the second value, it is determined that the one or more target spatial relation parameters include the second spatial relation parameter and the third spatial relation parameter.

In an embodiment, the first value of the transport block field indicates that the quantity of codewords is 1. In an embodiment, the second value of the transport block field indicates that the quantity of codewords is 2.

For example, the first spatial relation parameter includes a second spatial relation parameter (a TCI 1) and a third spatial relation parameter (a TCI 5). When the first value of the transport block field indicates that the quantity of codewords is 1, the target spatial relation parameter is the second spatial relation parameter; and/or when the first value of the transport block field indicates that the quantity of codewords is 2, the target spatial relation parameter includes the second spatial relation parameter and the third spatial relation parameter.

In an embodiment, when the state value of the transport block field is the first value, it is determined that the one or more target spatial relation parameters are the second spatial relation parameter; and/or when the state value of the transport block field is the second value and the state value of the antenna port field is the first value, it is determined that the one or more target spatial relation parameters are the second spatial relation parameter (e.g., a first codeword and a second codeword are received based on the second spatial relation parameter); and/or when the state value of the transport block field is the second value and the state value of the antenna port field is the second value, it is determined that the one or more target spatial relation parameters include the second spatial relation parameter and the third spatial relation parameter (e.g., a first codeword is received based on the second spatial relation parameter, and optionally, a second codeword is received based on the third spatial relation parameter).

In an embodiment, the first value of the transport block field indicates that the quantity of codewords is 1. In an embodiment, the second value of the transport block field indicates that the quantity of codewords is 2.

For example, the first spatial relation parameter includes a second spatial relation parameter (for example, a TCI 1) and a third spatial relation parameter (for example, a TCI 5). When the first value of the transport block field indicates that the quantity of codewords is 1, the one or more target spatial relation parameters are the second spatial relation parameter. When the second value of the transport block field indicates that the quantity of codewords is 2, and the first value of the antenna port field is 0 to 3, the one or more target spatial relation parameters are the second spatial relation parameter (e.g., a first codeword and a second codeword are received based on the second spatial relation parameter). When the second value of the transport block field indicates that the quantity of codewords is 2, and the second value of the antenna port field is 4 to 31, the one or more target spatial relation parameters include the second spatial relation parameter and the third spatial relation parameter (e.g., a first codeword is received based on the second spatial relation parameter, and optionally, a second codeword is received based on the third spatial relation parameter).

In an embodiment, when the state value of the transport block field is the first value, it is determined that the one or more target spatial relation parameters are the first spatial relation parameter; and/or when the state value of the transport block field is the second value and the state value of the antenna port field is the first value, it is determined that the one or more target spatial relation parameters are the second spatial relation parameter (e.g., a first codeword and a second codeword are received based on the second spatial relation parameter); and/or when the state value of the transport block field is the second value and the state value of the antenna port field is the second value, it is determined that the one or more target spatial relation parameters include the second spatial relation parameter and the third spatial relation parameter (e.g., a first codeword is received based on the second spatial relation parameter, and optionally, a second codeword is received based on the third spatial relation parameter).

In an embodiment, the first value of the transport block field indicates that the quantity of codewords is 1. In an embodiment, the second value of the transport block field indicates that the quantity of codewords is 2.

For example, the first spatial relation parameter includes a second spatial relation parameter (for example, a TCI 1) and a third spatial relation parameter (for example, a TCI 5). When the first value of the transport block field indicates that the quantity of codewords is 1, the one or more target spatial relation parameters are the first spatial relation parameter. When the second value of the transport block field indicates that the quantity of codewords is 2, and the first value of the antenna port field is 0 to 3, the one or more target spatial relation parameters are the second spatial relation parameter (e.g., a first codeword and a second codeword are received based on the second spatial relation parameter). When the second value of the transport block field indicates that the quantity of codewords is 2, and the second value of the antenna port field is 4 to 31, the one or more target spatial relation parameters include the second spatial relation parameter and the third spatial relation parameter.

In an embodiment, a first codeword is received based on the second spatial relation parameter, and optionally, a second codeword is received based on the third spatial relation parameter.

In an embodiment, when the state value of the transport block field is the first value, it is determined that the one or more target spatial relation parameters are the first spatial relation parameter or the second spatial relation parameter; and/or when the state value of the transport block field is the second value and the information indicated by the antenna port field is the first value, it is determined that the one or more target spatial relation parameters are the second spatial relation parameter (e.g., a first codeword and a second codeword are received based on the second spatial relation parameter); and/or when the state value of the transport block field is the second value and the information indicated by the antenna port field is the second value, it is determined that the one or more target spatial relation parameters are the third spatial relation parameter (e.g., a first codeword and a second codeword are received based on the third spatial relation parameter); and/or when the state value of the transport block field is the second value and the information indicated by the antenna port field includes the first value and the second value, it is determined that the one or more target spatial relation parameters include the second spatial relation parameter and the third spatial relation parameter (e.g., a first codeword is received based on the second spatial relation parameter, and optionally, a second codeword is received based on the third spatial relation parameter).

In an embodiment, the first value of the transport block field indicates that the quantity of codewords is 1. In an embodiment, the second value of the transport block field indicates that the quantity of codewords is 2. In an embodiment, the information indicated by the antenna port field is a DMRS port CDM group identifier.

For example, the first spatial relation parameter includes a second spatial relation parameter (for example, a TCI 1) and a third spatial relation parameter (for example, a TCI 5). When the first value of the transport block field indicates that the quantity of codewords is 1, the one or more target spatial relation parameters are the first spatial relation parameter or the second spatial relation parameter. When the second value of the transport block field indicates that the quantity of codewords is 2, and the DMRS port CDM group identifier indicated by the antenna port field is the first value, the one or more target spatial relation parameter (e.g., a first codeword and a second codeword are received based on the second spatial relation parameter). When the second value of the transport block field indicates that the quantity of codewords is 2, and the DMRS port CDM group identifier indicated by the antenna port field is the second value, the one or more target spatial relation parameters are the third spatial relation parameter. When the second value of the transport block field indicates that the quantity of codewords is 2, and the DMRS port CDM group identifier indicated by the antenna port field includes the first value and the second value, the one or more target spatial relation parameters include the second spatial relation parameter and the third spatial relation parameter (e.g., a first codeword is received based on the second spatial relation parameter, and optionally, a second codeword is received based on the third spatial relation parameter).

It should be understood that the first value and the second value in this application may be a value range or a value, the first value may include one or more values, and the second value may include one or more values.

It should be understood that first values of different information or different fields may be different, and second values of different information or different fields may be different. Various values are not specifically limited in this embodiment of this application.

According to a second aspect, an embodiment provides an information transmission method. The method includes: A network device sends first signaling, where the first signaling includes a first field, a state value of the first field is used to indicate a first spatial relation parameter for receiving a first channel, the state value of the first field is one of a plurality of candidate state values corresponding to the first field, and at least one of the plurality of candidate state values corresponds to two or more spatial relation parameters. The network device sends the first channel based on one or more target spatial relation parameters in the first spatial relation parameter.

In an embodiment, the method further includes: sending second signaling, where the second signaling is used to configure M spatial relation parameter sets, and M≥1. The $i^{th}$ spatial relation parameter set of the M spatial relation parameter sets includes Li spatial relation parameters, there is a correspondence between each of the Li spatial relation parameters and a candidate state value of the first field, 1≤i≤M, Li≥2, and M, i, and Li are all integers.

In an embodiment, the method further includes: sending the first information, where the first information is at least one of the following: at least one second field in the first signaling, an identifier of a control resource set to which the first signaling belongs, an identifier of a search space set to which the first signaling belongs, the state value of the first field, and an antenna panel identifier.

It should be understood that, in this application, the first information may be alternatively other information, for example, transmission mode indication information. Any manner obtained through simple extension or simple combination falls within the protection scope of this application.

In an embodiment, the second field is a transport block field or an antenna port field, the transport block field is used to indicate a quantity of codewords, and the antenna port field is used to indicate at least one DMRS port number.

In an embodiment, the method further includes: sending third signaling, where the third signaling includes second information, and the second information is used to configure a correspondence between the first information and the one or more target spatial relation parameters.

In an embodiment, the M spatial relation parameter sets include P second spatial relation parameter sets and Q third spatial relation parameter sets, there is a correspondence between the P second spatial relation parameter sets and a first value, and there is a correspondence between the Q third spatial relation parameter sets and a second value. The first value and the second value are any one of the following: a DMRS port identifier, an identifier of a group to which a DMRS port belongs, or codeword information that is indicated by the second field; the identifier of the control resource set; the identifier of the search space set; the antenna panel identifier; or the state value of the first field.

In another embodiment, at least one of the M spatial relation parameter sets includes the P second spatial relation parameters; and at least one of the M spatial relation parameter sets includes the Q third spatial relation parameters; or at least one of the M spatial relation parameter sets includes the P second spatial relation parameters and the Q third spatial relation parameters.

In an embodiment, the spatial relation parameter is a transmission configuration indicator TCI state, quasi-colocation QCL information, or a reference signal RS. The RS is used to indicate QCL information of the first channel.

According to a third aspect, an embodiment further provides a communications apparatus. The communications apparatus is configured to implement the method in the first aspect and the embodiments of the first aspect. The apparatus includes a receiving unit and a processing unit. In an embodiment, the communications apparatus may further include a sending unit, a storage unit, or other necessary units and modules.

In an embodiment, the receiving unit is configured to receive first signaling, and the processing unit is configured to obtain one or more target spatial relation parameters in the first spatial relation parameter, and receive the first channel based on the one or more target spatial relation parameters. The first signaling includes a first field. A state value of the first field is used to indicate the first spatial relation parameter for receiving the first channel. The state value of the first field is one of a plurality of candidate state values corresponding to the first field. At least one of the plurality of candidate state values corresponds to two or more spatial relation parameters.

In an embodiment, before receiving the first signaling, the receiving unit is further configured to receive second signaling. The second signaling is used to configure M spatial relation parameter sets, and M≥1. The $i^{th}$ spatial relation parameter set of the M spatial relation parameter sets includes Li spatial relation parameters. There is a correspondence between each of the Li spatial relation parameters and a candidate state value of the first field. 1≤i≤M, Li≥2, and M, i, and Li are all integers.

In an embodiment, the processing unit is further specifically configured to determine the one or more target spatial relation parameters in the first spatial relation parameter based on first information. The first information is at least one of the following: at least one second field in the first signaling, an identifier of a control resource set to which the first signaling belongs, an identifier of a search space set to which the first signaling belongs, an antenna panel identifier, and the state value of the first field.

It should be understood that, in this application, the first information may be alternatively other information, for example, transmission mode indication information. Any manner obtained through simple extension or simple combination falls within the protection scope of this application.

In an embodiment, the second field is a transport block field or an antenna port field, the transport block field is used to indicate a quantity of codewords, and the antenna port field is used to indicate at least one DMRS port number.

According to a fourth aspect, an embodiment further provides a communications apparatus. The communications apparatus is further configured to implement the method in the second aspect and the embodiments of the second aspect. The apparatus includes a sending unit and a processing unit. In an embodiment, the communications apparatus may further include a receiving unit, a storage unit, or other necessary units and modules.

In an embodiment, the sending unit is configured to send first signaling. The first signaling includes a first field. A state value of the first field is used to indicate a first spatial relation parameter for receiving a first channel. The state value of the first field is one of a plurality of candidate state values corresponding to the first field. At least one of the plurality of candidate state values corresponds to two or more spatial relation parameters.

According to a fifth aspect, an embodiment further provides a communications device, including: a processor, where the processor is coupled to a memory; and the memory, configured to store instructions. The processor is configured to execute the instructions in the memory, so that the communications device performs the method according to any one of the first aspect or the embodiments of the first aspect, or implements the method according to any one of the second aspect or the embodiments of the second aspect.

According to a sixth aspect, an embodiment further provides a computer storage medium, including computer instructions. When the computer instructions are run on a device, the device is enabled to perform the method according to any one of the first aspect or the embodiments of the first aspect, or implement the method according to any one of the second aspect or the embodiments of the second aspect.

According to a seventh aspect, this application further provides a computer program product. When the computer program product is run on a computer, the method according to any one of the first aspect or the embodiments of the first aspect is implemented, or the method according to any one of the second aspect or the embodiments of the second aspect is implemented.

According to the information transmission method and the communications apparatus and device provided in this application, a terminal receives the first signaling sent by a base station, where the state value of the first field is configured in the first signaling, to indicate a target spatial relation parameter in a plurality of spatial relation parameters, so that the terminal may receive the first channel by using the target spatial relation parameter, to cope with an issue of QCL information indication in various transmission scenarios.

In addition, in this method, at least one of the plurality of candidate state values of the terminal corresponds to two or more spatial relation parameters. Therefore, compared with an existing method in which one state value corresponds to only one spatial relation parameter, flexibility of TCI information configuration is improved. In addition, an association relationship that one candidate state value corresponds to a plurality of spatial relation parameters is configured, thereby further reducing indication overheads.

BRIEF DESCRIPTION OF DRAWINGS

FIG. 8 is a schematic diagram of another correspondence between an antenna port value and a DMRS port according to an embodiment of this application;

DESCRIPTION OF EMBODIMENTS

Figure 1:
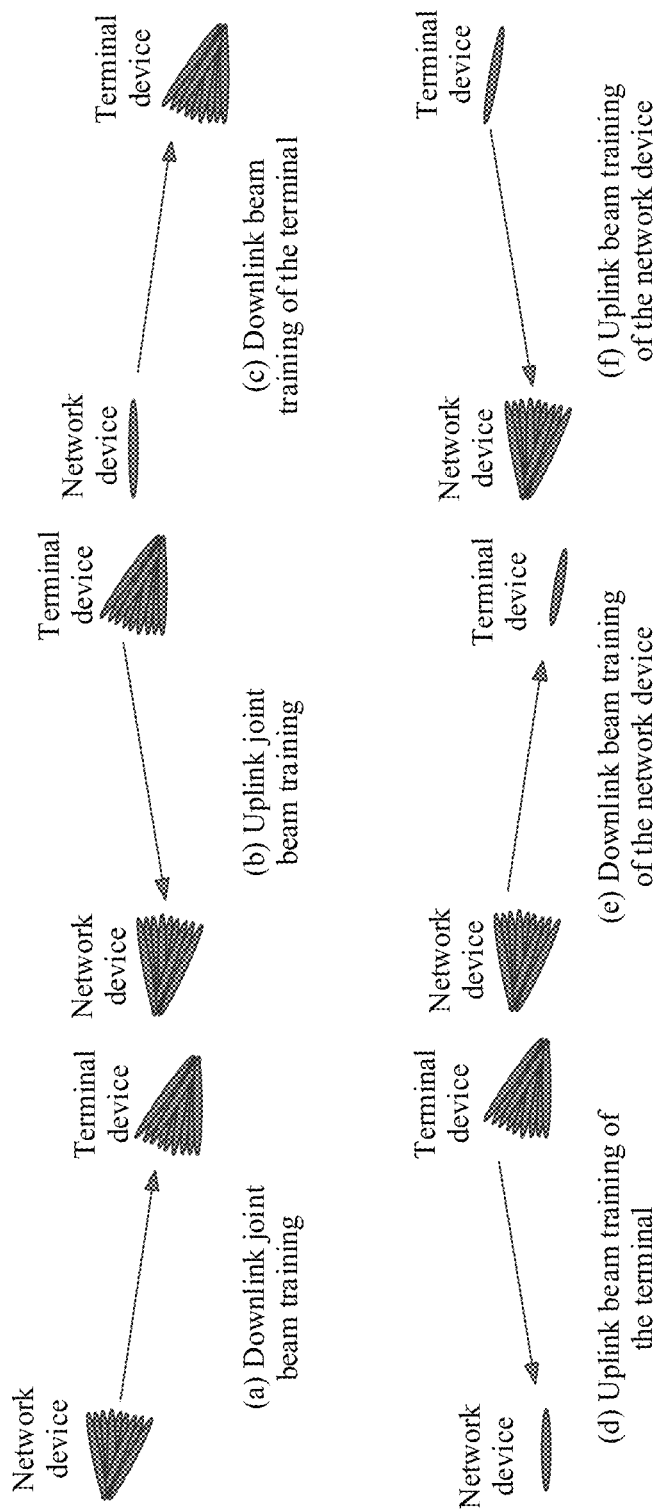
FIG. 1 is a schematic diagram of beam training according to this application.

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

Before the technical solutions in the embodiments of this application are described, related technical terms and application scenarios in the embodiments of this application are explained and described first.

1. Control Resource Set (Control Resource Set, CORESET)

CORESET: To improve efficiency of performing blind detection on a control channel by a terminal, a concept of a control resource set is proposed during formulation of an NR standard. A network device may configure one or more resource sets for UE, to send a physical downlink control channel (PDCCH). The network device may send the control channel to the terminal on any control resource set corresponding to the terminal. In addition, the network device further needs to notify the terminal of another configuration associated with the control resource set, for example, a search space set. Configuration information of control resource sets varies. For example, frequency-domain widths vary, or time-domain duration varies.

In an embodiment, the control resource set in this application may be a CORESET, a control region, or an ePDCCH set defined in a 5G mobile communications system.

2. Quasi-Colocation (QCL) Assumption Information

QCL information: Quasi-co-site or quasi-colocation QCL assumption information may also be referred to as QCL information. The QCL information is used to assist in describing beamforming information and a reception procedure on a receive side of a terminal.

Further, the QCL information is used to indicate a QCL relationship between two reference signals: a source reference signal and a target reference signal. The target reference signal may be generally a demodulation reference signal (DMRS), a channel state information reference signal (CSI-RS), or the like. A referenced reference signal or the source reference signal may be generally a CSI-RS, a tracking reference signal (TRS), a synchronization signal/broadcast channel block (SSB), or the like. It should be understood that spatial characteristic parameters of two reference signals or channels that meet a QCL relationship are the same, so that a spatial characteristic parameter of the target reference signal may be inferred based on a resource index of the source reference signal. The spatial characteristic parameter includes one or more of the following parameters: an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay (average delay), a delay spread, a Doppler spread, a Doppler shift, a spatial receive parameter, and the like.

These spatial characteristic parameters describe characteristics of a spatial channel between antenna ports of the source reference signal and the target reference signal, so that the terminal can perform a beamforming or reception processing process on the receive side based on the QCL information. It should be understood that the terminal may receive the target reference signal based on source reference signal reception information indicated by the QCL information.

To reduce overheads of indicating the QCL information by a network device side to the terminal side, in an embodiment, the network device side may indicate that a demodulation reference signal of a physical downlink control channel (PDCCH) or a physical downlink shared channel (PDSCH) and one or more of a plurality of reference signal resources previously reported by the terminal meet a QCL relationship. For example, the reference signal may be a CSI-RS. Herein, each reported CSI-RS resource index corresponds to one transmit/receive beam pair established during previous measurement based on the CSI-RS resource. It should be understood that receive beam information of two reference signals or channels that meet a QCL relationship is the same, so that the UE may infer, based on the reference signal resource index, receive beam information for receiving the PDCCH or the PDSCH.

Four QCL types are defined in an existing standard. A base station may configure one or more QCL types for UE, for example, a QCL type A and a QCL type D, or a QCL type C and a QCL type D:

QCL type A: a Doppler shift, a Doppler spread, an average channel delay (average delay), and a delay spread;

QCL type B: a Doppler shift and a Doppler spread;
QCL type C: an average channel delay and a Doppler shift; and
QCL type D: a spatial receive parameter.

It can be understood that the QCL information in this application includes one or more of the QCL type A, the QCL type B, the QCL type C, and the QCL type D.

3. Spatial Relation Information

The spatial relation information is used to assist in describing beamforming information or a transmission procedure on a transmit side of a terminal. Specifically, the spatial relation information is used to indicate a relationship between spatial receive parameters of two reference signals. A target reference signal may be generally a DMRS, a sounding reference signal (SRS), or the like. A referenced reference signal or a source reference signal may be generally a CSI-RS, an SRS, an SSB, or the like. It should be understood that spatial characteristic parameters of two reference signals or channels that meet spatial relation information are the same, so that a spatial characteristic parameter of the target reference signal may be inferred based on a resource index of the source reference signal. The spatial characteristic parameter is the same as the foregoing spatial characteristic parameter, for example, the angle of arrival (AoA), the dominant angle of arrival AoA, the average angle of arrival, . . . , or the spatial receive parameter. Examples are not described in detail herein. These spatial characteristic parameters describe characteristics of a spatial channel between antenna ports of the source reference signal and the target reference signal, so that the terminal can perform a beamforming or transmission processing process on the transmit side based on the spatial relation information. It should be understood that the terminal may transmit the target reference signal based on source reference signal transmission information indicated by the spatial relation information.

4. Transmission Configuration Indicator (TCI)

TCI information is used to indicate QCL information of a PDCCH/CORESET or a PDSCH. Further, the TCI information indicates that a reference signal included in a TCI and a DMRS of a PDCCH/PDSCH meet a QCL relationship, and is mainly used to indicate that during reception of the PDCCH/PDSCH, information such as a spatial characteristic parameter of the PDCCH/PDSCH is the same as, similar to, or approximate to information such as a spatial characteristic parameter of the reference signal included in the TCI.

5. Synchronization Signal/Broadcast Channel Block (SS/PBCH Block)

The SS/PBCH block may also be referred to as an SSB. A physical broadcast channel (PBCH). The SSB includes at least one of a primary synchronization signal (PSS), a secondary synchronization signal (SSS), and a PBCH, and is a signal mainly used for cell searches, cell synchronization, and carrying broadcast information.

6. Beam

A beam is a communication resource. The beam may be a wide beam, a narrow beam, or another type of beam. A technology for forming a beam may be a beamforming technology or another technical means. The beamforming technology may be specifically a digital beamforming technology, an analog beamforming technology, or a hybrid digital/analog beamforming technology. Different beams may be considered as different resources, and same information or different information may be sent by using different beams.

In an embodiment, a plurality of beams with a same communication feature or similar communication features may be considered as one beam. One beam may include one or more antenna ports, configured to transmit a data channel, a control channel, a sounding signal, and the like. For example, a transmit beam may be a distribution of signal strengths formed in different directions in space after a signal is transmitted by an antenna, and a receive beam may be a distribution of signal strengths, in different directions in space, of a radio signal received by an antenna. It can be understood that one or more antenna ports forming one beam may be alternatively considered as an antenna port set.

Beams may be classified into a transmit beam and a receive beam of a network device and a transmit beam and a receive beam of a terminal. The transmit beam of the network device, such as a base station, is used to describe beamforming information on a transmit side of the network device, and the receive beam of the base station is used to describe beamforming information on a receive side of the network device. Similarly, the transmit beam of the terminal is used to describe beamforming information on a transmit side of the terminal, and the receive beam of the terminal is used to describe beamforming information on a receive side of the terminal. Therefore, it is generally understood that a beam may be used to describe beamforming information.

In addition, a beam may correspond to one or more of a time resource, a space resource, and a frequency domain resource.

In an embodiment, a correspondence may be further generated between a beam and a reference signal resource (for example, a beamforming reference signal resource) or beamforming information.

In an embodiment, a beam may alternatively correspond to information associated with a reference signal resource of a network device. A reference signal may be a CSI-RS, an SSB, a DMRS, a phase tracking reference signal (PTRS), a TRS, or the like. The information associated with the reference signal resource may be a reference signal resource identifier, QCL information (particularly a QCL type D), TCI information, or the like. The reference signal resource identifier corresponds to a transmit/receive beam pair established during previous measurement based on the reference signal resource. A terminal may infer beam information by using the reference signal resource index.

In an embodiment, a beam may alternatively correspond to a spatial domain filter (spatial filter/spatial domain filter), a spatial domain transmission filter, a spatial filter, or a spatial transmission filter. A receive beam is equivalent to a spatial transmission filter, a spatial domain transmission filter, a spatial domain receive filter, or a spatial receive filter. A transmit beam may be equivalent to a spatial domain filter, a spatial domain transmission filter, a spatial domain transmit filter, or a spatial transmit filter. Spatial relation parameter information is equivalent to a spatial filter (spatial domain transmission/receive filter).

Further, the spatial filter generally includes a spatial transmit filter and/or a spatial receive filter. The spatial filter may also be referred to as a spatial domain transmit filter, a spatial domain receive filter, a spatial transmission filter, a spatial domain transmission filter, or the like. In an embodiment, a receive beam on a terminal side and a transmit beam on a network device side may serve as downlink spatial filters, and a transmit beam on the terminal side and a receive beam on the network device side may serve as uplink spatial filters.

7. Initial Bandwidth Part (BWP)

When a terminal in an RRC idle state accesses a cell or a wideband carrier, a BWP used during initial access of the terminal is referred to as an initial BWP, or this may be understood as that the terminal performs random access on the initial BWP.

8. Active BWP

When a service arrives at a terminal, a network device schedules the terminal from an initial BWP to a BWP whose bandwidth matches the service of the terminal, and may indicate, by using higher layer signaling or layer 1 signaling, a BWP on which the terminal device currently operates. The network device and the terminal may send and receive data and/or reference signals on the BWP. The BWP is referred to as an active BWP. When there is one carrier or one serving cell, one terminal has only one active BWP at one moment, and the terminal can receive or send data/reference signals only on the active BWP.

Currently, a communications system supports dynamic BWP switching. A network device indicates, by using downlink control information (DCI) or radio resource control (RRC) signaling, a terminal device to perform BWP switching. The DCI is located on a current BWP, and a size of a frequency domain resource allocation information field of the DCI is determined by bandwidth of the current BWP. The DCI includes a bandwidth part indicator information field, used to indicate an ID number of a BWP activated by the terminal. When a BWP ID number indicated by the information field is different from an ID number of a BWP currently activated by the terminal (that is, the current BWP used for transmitting the DCI), the terminal needs to switch from the current BWP to a BWP indicated in the DCI.

Currently, different types of reference signals are usually used in a communications system. One type of reference signal is used for channel estimation, for example, a DMRS, to perform coherent demodulation on a received signal that includes control information or data. Another type is used for channel state or channel quality measurement, for example, a CSI-RS, to schedule UE. The UE obtains channel state information (CSI) by performing channel quality measurement by using the CSI-RS. The CSI includes at least one of a rank indicator (RI), a precoding matrix indicator (PMI), a channel quality indicator (CQI), and the like. The CSI information may be sent by the UE to a base station by using a physical uplink control channel (PUCCH) or a physical uplink shared channel (PUSCH).

An existing method for indicating spatial relation parameter information of a PDSCH or a PUSCH is as follows:

Beam indication for the PDSCH is mainly implemented by using TCI information. For example, joint indication is performed by using radio resource control (RRC) signaling, medium access control (MAC-CE) signaling, and downlink control information (DCI); or joint indication may be performed by using RRC signaling and DCI.

Specifically, a dynamic indication method includes:
configuring M candidate transmission configuration indicator (TCI) states for the PDSCH by using the RRC, where each candidate TCI state includes one piece of QCL information; and
activating $2^N$ TCI states (a subset of the M TCI states) from the M TCI states by using the MAC-CE.

Table 1 is a schematic diagram of indicating an active or inactive state of a TCI field by using a MAC-CE.

TABLE 1

| R | Serving cell identifier/Serving cell ID | | | | | Bandwidth part identifier/BWP ID | |
|---|---|---|---|---|---|---|---|
| T7 | T6 | T5 | T4 | T3 | T2 | T1 | T0 |
| T15 | T14 | T13 | T12 | T11 | T10 | T9 | T8 |
| ... | ... | ... | ... | ... | ... | ... | ... |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ |

The serving cell identifier (serving cell ID) is used to indicate an ID of a serving cell to which a TCI indicated by the MAC-CE belongs.

The bandwidth part (BWP) ID is used to indicate a downlink bandwidth part on which the MAC-CE is used.

A Ti field is used to indicate an active/inactive state of a TCI state with a TCI state ID i. Further, if the Ti field is "1", it indicates that the TCI with the TCI state ID i is in the active state and is mapped to a TCI field in DCI. If the Ti field is "0", it indicates that the TCI state with the TCI state ID i is in the inactive state and is not mapped to a TCI field in DCI.

"R" indicates a reserved bit, and is usually set to "0".

During mapping from TCI states to codepoints of DCI, all TCI states whose Ti fields are set to "1" are mapped to the codepoints in sequence. For example, the $1_{st}$ TCI state whose Ti field is set to "1" is mapped to a location of a codepoint value 0, the $2^{nd}$ TCI state whose Ti field is set to "1" is mapped to a location of a codepoint value 1, and so on. A maximum quantity of values of active TCI states is 8.

The TCI field in the DCI includes N bits used to indicate that one of 2N TCI states is used for receiving a PDSCH. In an existing protocol, when N=3, DCI shown in Table 2 may be used to indicate one of TCI states.

TABLE 2

| State value of a TCI field/ Value of TCI field | TCI state/TCI state |
|---|---|
| 000 | TCI state ID a1 |
| 001 | TCI state ID a2 |
| 010 | TCI state ID a3 |
| 011 | TCI state ID a4 |
| 100 | TCI state ID a5 |
| 101 | TCI state ID a6 |
| 110 | TCI state ID a7 |
| 111 | TCI state ID a8 |

Whether DCI fields include a TCI field for a PDSCH may be indicated by using higher layer signaling, for example, a TCI-PresentInDCI field in RRC signaling. This field may be configured for each CORESET. When this field is configured for a CORESET and is enabled, a TCI field exists in DCI detected in the CORESET. When this field is not configured for a CORESET, no TCI field exists in DCI detected in the CORESET. In an embodiment, a TCI state of the PDSCH is a TCI state configured for a PDCCH.

When a scheduling offset value is less than a threshold k, UE receives the PDSCH by using a default TCI state. When a scheduling offset value is greater than the threshold k, the UE receives the PDSCH by using a TCI state ID indicated in the DCI. It is stipulated that, in an initial RRC and MAC-CE stage, the UE assumes that DMRSs of the PDCCH and the PDSCH and a synchronization signal/broadcast channel block (SSB) determined during initial access are QCL-based.

For beam indication for a PUSCH, beam information implemented by the PUSCH may be jointly indicated by RRC signaling, MAC-CE signaling, and DCI, or may be indicated by RRC information and DCI. The DCI includes a sounding reference signal resource indicator (SRI) field, used to indicate the beam information (spatial relation information) of the PUSCH. Spatial relation indication in a protocol is as follows:

Generally, a base station configures, by using signaling, a TCI table or a TCI set used to indicate QCL information of a data channel. A TCI field in DCI indicates a TCI state in the TCI table or the TCI set. A state value of each TCI field corresponds to only one transmission configuration indicator TCI state ID (QCL information). For example, the base station indicates 64 TCI states by using RRC signaling for receiving a PDSCH, and activates eight of the 64 TCI states by using MAC-CE signaling. IDs of the eight TCI states are a1 to a8. A state value 000 of a DCI field corresponds to a TCI state ID a1. A terminal device receives the PDSCH based on a TCI state indicated by the TCI state ID a1.

Figure 2A:
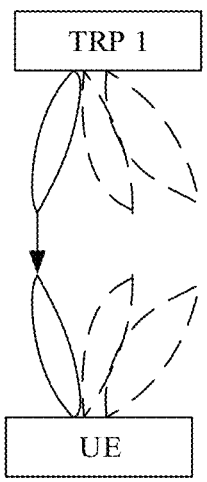
FIG. 2A is a schematic diagram of single-TRP single-beam transmission according to an embodiment of this application.

For another example, the DCI indicates one of three beams. To be specific, data sent by a TRP 1 on one of the three optional beams is correspondingly received by receive-end UE by using one beam, that is, one piece of data scheduled by one piece of DCI signaling comes from one TRP, as shown in FIG. 2A. This scenario belongs to a single-TRP single-beam transmission mode.

Figure 2B:
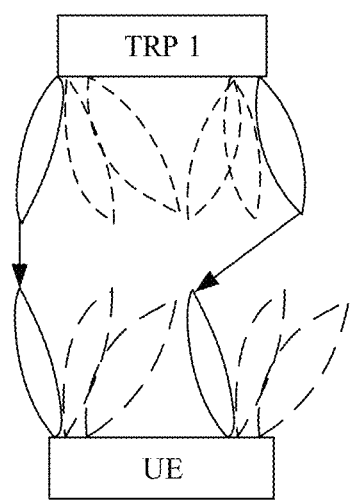
FIG. 2B is a schematic diagram of single-TRP multi-beam transmission according to an embodiment of this application.
Figure 2C:
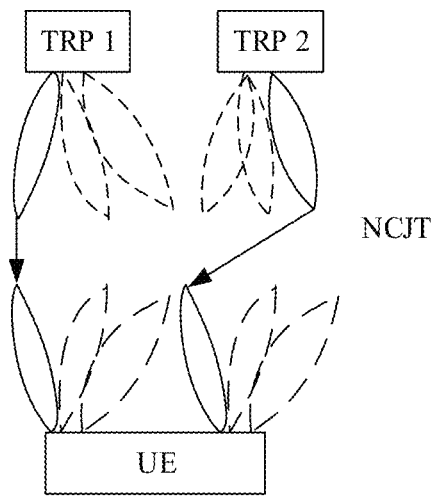
FIG. 2C is a schematic diagram of multi-TRP multi-beam transmission according to an embodiment of this application.

In addition, transmission modes in other scenarios are further included. For example, as shown in FIG. 2B, a TRP 1 sends data to UE by simultaneously using two beams. This scenario belongs to a single-TRP multi-beam transmission mode. In addition, in a multi-TRP multi-beam simultaneous transmission scenario shown in FIG. 2C, a TRP 1 and a TRP 2 each transmit data to UE by using one beam, that is, one piece of data comes from two different TRPs. In an embodiment, the multi-TRP multi-beam transmission scenario may also be referred to as a non-coherent joint transmission (NCJT) scenario. In this scenario, UE requires a plurality of pieces of beam indication information for receiving a data channel.

Figure 2D:
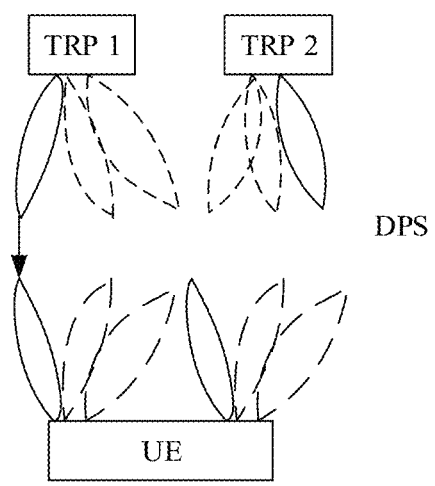
FIG. 2D is a schematic diagram of beam transmission in a DPS scenario according to an embodiment of this application.

In an embodiment, a possible transmission scenario is further included. A plurality of pieces of DCI each schedule one piece of data, and data comes from different TRPs, that is, a dynamic point selection (DPS) transmission scenario shown in FIG. 2D.

For the foregoing possible transmission scenarios, a current form of a TCI state ID table cannot support a case in which one piece of DCI schedules data from a plurality of TRPs; and when a plurality of pieces of DCI schedule data from a plurality of TRPs, flexibility of currently indicating TCI information by DCI is comparatively low, and comparatively large overheads of indication information are caused when different TCI field states are indicated in various transmission scenarios.

To resolve the foregoing problems, this application provides the following technical solutions. Before the technical solutions in the embodiments are described, technical scenarios in which the technical solutions in this application may be used are described first.

The technical solutions provided in this application may be used in various communications systems, for example, a new radio (NR) system in a fifth-generation (5G) mobile communications system or a future mobile communications system. The 5G mobile communications system includes a non-standalone (NSA) 5G mobile communications system and/or a standalone (SA) 5G mobile communications system. This is not limited in this application.

Figure 3:
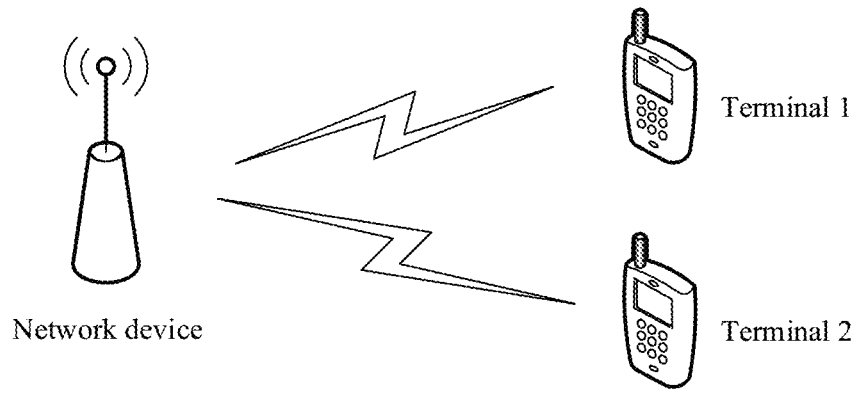
FIG. 3 is a schematic diagram of an application scenario according to an embodiment of this application.

In the foregoing communications systems, referring to FIG. 3, this application provides a specific technical scenario that includes at least one terminal and a network device. For example, FIG. 3 shows an application scenario including one network device, a terminal 1, and a terminal 2. It can be understood that the scenario may alternatively include another quantity of terminals and network devices. This is not limited in this application.

The terminal may be referred to as an access terminal, user equipment (UE), a subscriber unit, a subscriber station, a mobile station, a mobile console, a remote station, a remote terminal, a mobile device, a user terminal, a terminal, a wireless communication device, a user agent, a user apparatus, or the like. Further, the access terminal may be a cellular phone, a handheld device with a wireless communication function, a computing device, another processing device connected to a wireless modem, a vehicle-mounted device, a wearable device, user equipment in a 5G communications system, or the like.

The network device may be a base transceiver station (BTS) in a code division multiple access (CDMA) system, or may be a NodeB (NB) in a wideband code division multiple access (WCDMA) system, or may be an evolved NodeB (eNB) in an LTE system, or may be a gNB in a 5G mobile communications system. The foregoing base stations are merely examples for description. The network device may be alternatively a relay station, an access point, a vehicle-mounted device, a wearable device, or another type of device.

The following describes in detail the technical solutions provided in the embodiments of this application by using an example in which the network device is a base station and the terminal is UE.

Embodiment 1

This embodiment provides an information transmission method. The method may be used in the foregoing transmission scenarios, for example, a scenario in which a plurality of pieces of DCI correspond to a plurality of TRPs, or a DPS scenario. Data of different TRPs may be scheduled by DCI at different moments. A specific process of determining, by UE, a spatial relation parameter used for current data is as follows.

Figure 4:
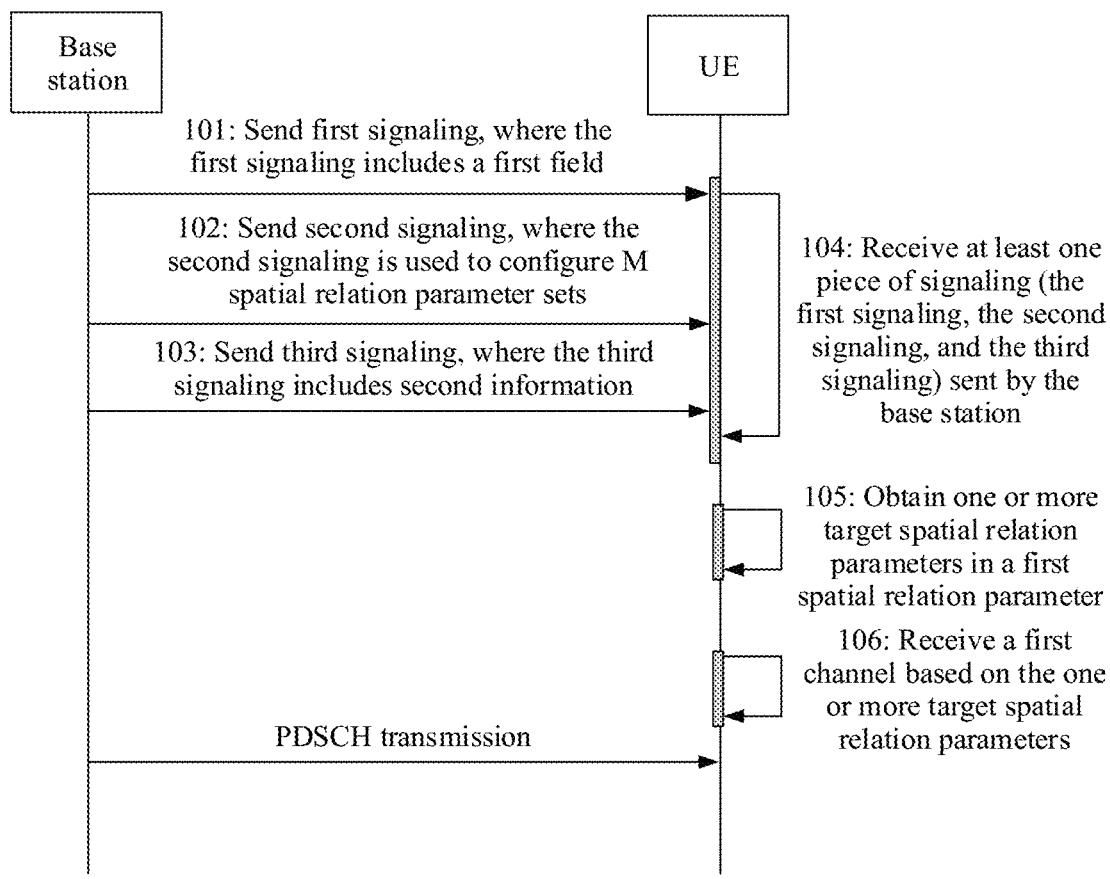
FIG. 4 is a signaling flowchart of a data transmission method according to an embodiment of this application.

As shown in FIG. 4, the method provided in this embodiment includes the following operations.

Operation 101: A base station sends first signaling.

The first signaling includes a first field. A state value of the first field is used to indicate a first spatial relation parameter for receiving a first channel. The state value of the first field is one of a plurality of candidate state values corresponding to the first field. At least one of the plurality of candidate state values corresponds to two or more spatial relation parameters.

Further, the spatial relation parameter includes a TCI state, a TCI state ID, QCL information, a reference signal, or a reference signal index. In an embodiment, the reference signal and the first channel meet a QCL relationship. For example, spatial relation parameter information indicates two reference signals (RS): an RS 1 and an RS 2. It can be understood that the spatial relation parameter may be alternatively indicated to UE by using another characteristic parameter, and is used for receiving the first channel. A specific form of the spatial relation parameter is not limited in this application. In an embodiment, the RS may be spatial relation information.

In an embodiment, the first channel includes a PDSCH or a PUSCH.

In an embodiment, the first channel includes a PUCCH or a PDCCH.

In an embodiment, in this embodiment of this application, for downlink channel transmission, the spatial relation parameter is a TCI state or QCL information; and for uplink channel transmission, the spatial relation parameter is spatial relation information.

In an embodiment, the first signaling is DCI signaling. Further, a format of the DCI signaling is a DCI format 1-1.

In this embodiment, an example in which the spatial relation parameter is a TCI state ID is used. For example, a spatial relation parameter being a TCI state ID may be expressed as a "TCI state ID a1", where a1 is a value of the TCI state ID. Alternatively, a value of the TCI state ID may be a2, a3, . . . , a8, b1, b2, c1, c2, or the like.

In an embodiment, in the embodiments of this application, if a TCI state ID is used to represent a spatial relation parameter, the TCI state ID a1 may be expressed as a "TCI state ID a1" or simply a "TCI ID a1", a "TCI a1", or a "TCI 1".

The first field is a TCI field, and may be abbreviated as a "Ti field". The first field may correspond to a plurality of state values (value of TCI field), and each state value may correspond to one or more spatial relation parameters. Referring to Table 1, eight state values are included: 000 to 111, and each state value corresponds to one spatial relation parameter. For example, a spatial relation parameter (a TCI state ID) corresponding to the state value "000" of the TCI field is a1, a spatial relation parameter (a TCI state ID) corresponding to "001" is a2, and so on.

In an embodiment, the eight state values from 000 to 111 shown in Table 1 are all candidate state values of the first field, and a state value corresponding to the first field carried in the first signaling is one of the eight candidate state values. For example, the state value of the first field is "000". That at least one of the plurality of candidate state values corresponds to two or more spatial relation parameters may be understood as follows: At least one of the eight candidate state values, for example, "000", has a correspondence with each of two or more TCI state IDs. For example, 000 corresponds to the TCI state ID a1, and 000 corresponds to a TCI state ID b1, where a1 and b1 separately belong to different spatial relation parameter sets.

In an embodiment, the state value of the first field in the first signaling corresponds to one spatial relation parameter. For example, the state value "000" corresponds to the TCI state ID a1.

In an embodiment, the state value of the first field in the first signaling corresponds to two or more spatial relation parameters. For example, the state value "000" corresponds to TCI state IDs c1 and c9.

In an embodiment, the first signaling is DCI signaling.

In an embodiment, the first signaling further includes first information, and the first information is used to determine one or more spatial relation parameters in the first spatial relation parameter. Further, the first information may be at least one of the following information: at least one second field in the first signaling, an identifier (CORESET ID) of a control resource set to which the first signaling belongs, and an identifier (search space ID) of a search space set to which the first signaling belongs.

The second field is a transport block field or an antenna port field.

Operation 102: The base station sends second signaling.

The second signaling is used to configure M spatial relation parameter sets, and M≥1. The $i^{th}$ spatial relation parameter set of the M spatial relation parameter sets includes Li spatial relation parameters. There is a correspondence between each of the Li spatial relation parameters and a plurality of candidate state values of the first field. 1≤i≤M, Li≥2, and M, i, and Li are all integers.

In an embodiment, the second signaling is RRC signaling, or RRC signaling and MAC-CE signaling.

In an embodiment, the second signaling may be executed before or after operation 101. This is not limited in this application.

The second signaling is configured by the base station and delivered to UE. The second signaling is used to indicate a candidate spatial relation parameter for receiving a PDSCH, for example, a TCI state table or a TCI state set. For example, Table 2 shows a correspondence between a candidate state value of the first field and a TCI state ID.

The base station may further configure another spatial relation parameter set by using the second signaling, as shown in Table 3.

TABLE 3

| State value of a TCI field/<br>Value of TCI field | TCI state ID/<br>TCI state ID |
| --- | --- |
| 000 | TCI state ID b1 |
| 001 | TCI state ID b2 |
| 010 | TCI state ID b3 |
| 011 | TCI state ID b4 |
| 100 | TCI state ID b5 |
| 101 | TCI state ID b6 |
| 110 | TCI state ID b7 |
| 111 | TCI state ID b8 |

Table 3 shows eight candidate state values of the TCI field and a TCI state ID corresponding to each candidate state value. Each candidate state value corresponds to one spatial relation parameter (a TCI state ID b). In addition, the eight spatial relation parameters from b1 to b8 form a set, which is referred to as a spatial relation parameter set.

With reference to Table 2 and Table 3, the base station configures two spatial relation parameter sets by using the second signaling, and M=2. The $1^{st}$ spatial relation parameter set includes a total of eight spatial relation parameters whose TCI state IDs range from a1 to a8, that is, a first spatial parameter set {TCI a1, TCI a2, . . . , TCI a8}. The $2^{nd}$ spatial relation parameter set includes a total of eight spatial relation parameters whose TCI state IDs range from b1 to b8, that is, a second spatial relation parameter set {TCI b1, TCI b2, . . . , TCI b8}. It can be understood that a third spatial relation parameter set, a fourth spatial relation parameter set, or more spatial relation parameter sets may be further included. Examples are not provided in this embodiment one by one.

In an embodiment, the spatial relation parameter "set" may be referred to as a spatial relation parameter "table" or a spatial relation parameter "list".

In an embodiment, in this embodiment, M=2, i=1 or 2, the $1^{st}$ spatial relation parameter set includes eight spatial relation parameters, and the $2^{nd}$ spatial relation parameter set also includes eight spatial relation parameters. In addition, there is a correspondence between each of the spatial relation parameters a1 to a8 or b1 to b8 and the candidate state values 000 to 111 of the TCI field.

In an embodiment, the two configured spatial relation parameter sets are used to receive data from different TRPs, or receive data from different antenna panels of one TRP, or receive data from different directions.

For example, the spatial relation parameter set {TCI a1, TCI a2, . . . , TCI a8} includes a spatial relation parameter used to indicate information sent by a TRP 1, and the other spatial relation parameter set {TCI b1, TCI b2, . . . , TCI b8} includes a spatial relation parameter used to indicate information sent by a TRP 2.

In an embodiment, a case in which the two spatial relation parameter sets are both used to indicate a spatial relation parameter of information sent by a single TRP is referred to as "single-TRP transmission", "single-TRP transmission", or "single-site transmission".

In an embodiment, the M spatial relation parameter sets may be configured by using one piece of second signaling, or may be configured by using a plurality of pieces of second signaling.

In an embodiment, the second signaling is DCI signaling.

Operation 103: The base station sends third signaling.

In an embodiment, the third signaling is RRC signaling and/or MAC-CE signaling.

The third signaling includes second information, and the second information is used to configure a correspondence between the first information and the one or more spatial relation parameters. The second information may be alternatively predefined in a protocol.

Further, when the second information is predefined in a protocol, the base station may not send the third signaling, and the second information is generated by the UE according to the predefinition in the protocol.

A correspondence between the one or more target spatial relation parameters in the first spatial relation parameter and a value of the first information and/or a value of information indicated by the first information includes the following cases.

Case 1:

When the first information is a DMRS port group identifier indicated by the at least one second field in the first signaling, the second information is used to configure a correspondence between the DMRS port group identifier and a spatial relation parameter.

For example, the M spatial relation parameter sets include P second spatial relation parameters {TCI a1, TCI a2, . . . , TCI a8} and Q third spatial relation parameters {TCI b1, TCI b2, . . . , TCI b8}.

In an embodiment, the DMRS port group identifier is an identifier of a CDM group to which a DMRS port belongs (a DMRS port CDM group), and the identifier of the CDM group may correspond to different spatial relation parameters based on different values. For example, a first value "00" of the DMRS port CDM group identifier corresponds to the P second spatial relation parameters, for example, the TCI a1 to the TCI a8, or a first spatial relation parameter set {TCI a1, TCI a2, . . . , TCI a8}; and a second value "01" of the DMRS port CDM group identifier corresponds to the Q third spatial relation parameters, for example, the TCI b1 to the TCI b8, or a second spatial relation parameter set {TCI b1, TCI b2, . . . , TCI b8}.

Case 2:

When the first information is the identifier of the control resource set to which the first signaling belongs, the second information is used to configure a correspondence between the identifier of the control resource set and a spatial relation parameter. For example, a CORESET ID 1 (a first value) corresponds to the P second spatial relation parameters, for example, a TCI list 1 or a TCI table 1, and the TCI list 1 or the TCI table 1 includes some or all of {TCI a1, TCI a2, . . . , TCI a8}. Similarly, a CORESET ID 2 (a second value) corresponds to the Q third spatial relation parameters, for example, a TCI list 2 or a TCI table 2, and the TCI list 2 or the TCI table 2 includes some or all of {TCI b1, TCI b2, . . . , TCI b8}.

Alternatively, the identifier of the control resource set may be a control resource set identifier group or a control resource set identifier set, and the CORESET group includes at least one CORESET ID. For example, for a CORESET group 1, the CORESET group 1 includes a CORESET ID 1, a CORESET ID 2, and the like.

Case 3:

When the first information is the identifier of the search space set to which the first signaling belongs, the second information is used to configure a correspondence between the identifier of the search space set and a spatial relation parameter. For example, a search space ID 1 (a first value) corresponds to the P second spatial relation parameters, for example, a TCI list 1 or TCI table 1 {TCI a1, TCI a2, . . . , TCI a8}; and a search space ID 2 (a second value) corresponds to the Q third spatial relation parameters, for example, a TCI list 2 or a TCI table 2 {TCI b1, TCI b2, . . . , TCI b8}.

In addition, the following cases may be further included.

Case 4:

When the first information is a DMRS port identifier indicated by the at least one second field in the first signaling, the second information is used to configure a correspondence between the DMRS port identifier and a spatial relation parameter. For example, a DMRS port number corresponds to a TCI list or a TCI table.

Case 5:

When the first information is codeword information indicated by the at least one second field in the first signaling, the second information is used to configure a correspondence between the codeword (CW) and a spatial relation parameter. For example, when there is one CW, the CW corresponds to the TCI a1; or when there are two codewords, the codewords correspond to the TCI a1 and the TCI b1, for example, a CW 1 corresponds to the TCI a1, and a CW 2 corresponds to the TCI b1. The "CW 1" indicates the $1^{st}$ codeword, and the "CW 2" indicates the $2^{nd}$ codeword.

Case 6:

The second field in the first signaling is a frequency domain resource configuration field, or the second field is a time domain resource configuration field. When the first information is a resource (a first resource and a second resource) indicated by the at least one second field in the first signaling, the second information is used to configure a correspondence between the resource and a spatial relation parameter. For example, the first resource corresponds to the TCI a1, and the second resource corresponds to the TCI b1.

It should be noted that another correspondence may be alternatively included, for example, a correspondence between the one or more spatial relation parameters and a panel identifier indicated by the at least one second field in the first signaling. This is not limited in this embodiment of this application.

It should be understood that, in this application, the first information may be alternatively other information, for example, transmission mode indication information. Any manner obtained through simple extension or simple combination falls within the protection scope of this application. The first information may be indicated by one or more of the first signaling, the second signaling, and the third signaling, or may be indicated by other signaling.

In an embodiment, the correspondence may include one of the following correspondences:

(1) One CDM group identifier, CORESET ID, search space ID, or antenna panel ID is associated with one or more spatial relation parameters or spatial relation parameter sets. For example, a CDM group identifier 00 may correspond to a TCI table 1 and a TCI table 2.

(2) One spatial relation parameter list or spatial relation parameter set is associated with at least one CDM group identifier, CORESET ID, search space ID, or antenna panel ID. For example, a TCI list 1 is associated with a CORESET ID 00, or CORESET IDs 00 and 01.

It can be understood that different spatial relation parameter sets may include a same spatial relation parameter. For example, both the TCI table 1 and the TCI table 2 include the spatial relation parameter TCI a1.

In addition, if both operation 102 and operation 103 are that the base station performs configuration by using signaling, the second signaling sent by the base station in operation 102 and the third signaling sent by the base station in operation 103 may be same signaling, and the base station may configure and send the first signaling and the third signaling simultaneously or non-simultaneously. A specific time sequence of performing configuration by the base station is not limited in this application. A time sequence for sending the first signaling, the second signaling, and the third signaling is not limited either.

Operation 104: The UE receives at least one piece of signaling sent by the base station.

The at least one piece of signaling includes the first signaling, the second signaling, and/or the third signaling sent by the base station.

In an embodiment, when a correspondence indicated or included in the second information is pre-agreed upon by the UE and the base station, the third signaling may not be received. In this case, in operation 104, the UE receives only the first signaling and the second signaling. For example, the correspondence indicated or included in the second information is stipulated in a protocol.

Operation 105: The UE obtains the one or more target spatial relation parameters in the first spatial relation parameter.

The obtaining may be understood as that the UE determines the one or more target spatial relation parameters in the first spatial relation parameter.

In an embodiment, operation 105 includes: determining the one or more spatial relation parameters based on the first information. More specifically, a determining process of this operation is described in detail in Embodiment 4, and is not described herein.

In an embodiment, operation 105 includes: determining the one or more spatial relation parameters based on the first information and the second information.

Figures 5, 6:
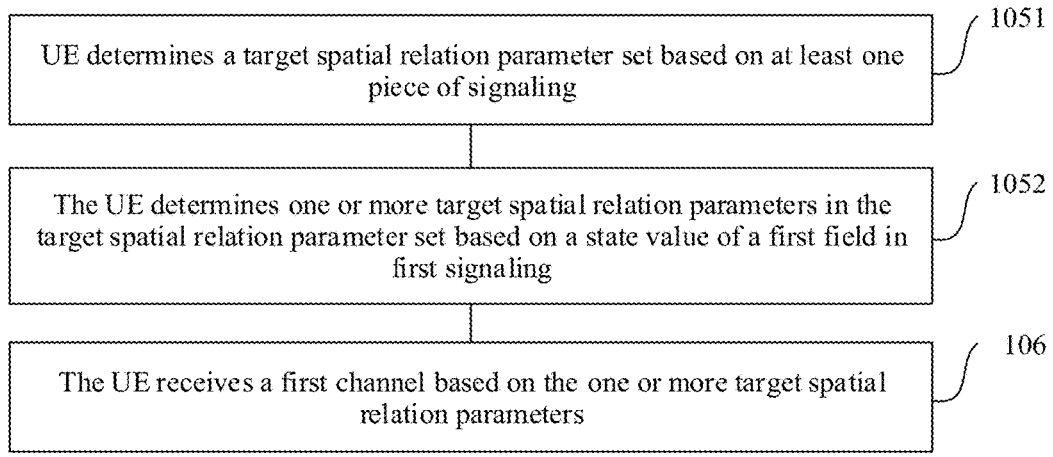
FIG. 5 is a flowchart of a data transmission method according to an embodiment of this application.
FIG. 6 is a schematic diagram of a correspondence between an antenna port field value and a DMRS port according to an embodiment of this application.

Further, as shown in FIG. 5, the determining the one or more target spatial relation parameters based on the first information and the second information specifically includes the following operations.

Operation 1051: The UE determines a target spatial relation parameter set based on the at least one piece of signaling.

Further, a process of determining the target spatial relation parameter based on content of the second information carried in the third signaling and the M spatial relation parameter sets configured by using the second signaling is as follows.

Operation 1: The UE receives two spatial relation parameter sets configured by using the second signaling.

In an embodiment, M=2, and spatial relation parameters in the spatial parameter set {TCI a1, TCI a2, . . . , TCI a8} shown in Table 2 are all used to indicate spatial relation parameters of information from one TRP, for example, a TPR 1, and the spatial parameter set {TCI b1, TCI b2, . . . , TCI b8} in Table 3 may be used to indicate spatial relation parameters of information from another TRP, for example, a TPR 2.

Operation 2: The UE obtains the first information and a correspondence between the first information and at least one spatial relation parameter or spatial relation parameter set. In an embodiment, the correspondence includes one or more of the case 1 to the case 5.

It should be understood that, in this application, the first information may be alternatively other information, for example, transmission mode indication information. Any manner obtained through simple extension or simple combination falls within the protection scope of this application. The first information may be indicated by one or more of the first signaling, the second signaling, and the third signaling, or may be indicated by other signaling.

Operation 3: The UE determines a valid spatial relation parameter set in operation 2 based on the second information in the third signaling, and uses the valid spatial relation parameter set as the target relation parameter set.

Operation 1052: The UE determines the one or more target spatial relation parameters in the target spatial relation parameter set based on the state value of the first field in the first signaling.

The state value of the first field is any one of the "values of the TCI fields" in Table 2 or Table 3. When the target relation parameter set is determined, a TCI state ID corresponding to a state value of the TCI field can be determined based on the correspondence in Table 2 or Table 3.

For example, when the state value of the first field is "000", a corresponding TCI state ID value is a1.

Operation 106: The UE receives the first channel based on the one or more target spatial relation parameters.

The UE receives the PDSCH by using the TCI state ID a1. Specifically, transmission for receiving the PCSCH may be the same as that in the prior art, and details are not described in this embodiment.

The following describes specific embodiment processes of operation 1051 and operation 1052 in this embodiment. First, for different cases in operation 103, the following processing manners may be used.

(1) Determining Method for the "Case 1":

The base station configures an association relationship between a DMRS port CDM group and a TCI state ID or a TCI table.

When a DMRS type is 1, a maximum of two DMRS port CDM groups are indicated to the UE, and the association relationship is shown in Table 4.

TABLE 4

| Value of a DMRS port CDM group | TCI list/table |
| --- | --- |
| 00 | TCI list 1 {TCI a1 TCI a2, ..., TCI a8}/ TCI table 1 |

TABLE 4-continued

| Value of a DMRS port CDM group | TCI list/table |
| --- | --- |
| 01 | TCI list 2 {TCI b1, TCIb2, ..., TCI b8}/ TCI table 2 |

When a DMRS type is 2, a maximum of three DMRS port CDM groups are indicated to the UE, and the association relationship is shown in Table 5.

TABLE 5

| Value of a DMRS port CDM group | TCI list/ table |
| --- | --- |
| 00 | TCI list 1 {TCI a1, TCI a2, ..., TCI a8}/ TCI table 1 |
| 01 | TCI list 2 {TCI b1, TCIb2, ..., TCI b5}/ TCI table 2 |
| 10 | TCI list 3 {TCI b6, TCI b7, ..., TCI b16} |

In an embodiment, the DCI signaling further includes a transport block field, used to indicate CW information (for example, a quantity of transmitted CWs).

In an embodiment, the DCI signaling further includes an antenna port field, used to indicate DMRS port information. A possible correspondence is shown in FIG. 6, or refer to a table in 38.212.

In operation 1501, the UE first determines a DMRS port number based on an antenna port value and the correspondence shown in FIG. 6; then determines, based on the DMRS port number, a DMRS port CDM group to which the DMRS port number belongs; and then determines, based on the DMRS port CDM group, a valid TCI set or table/list indicated by a current TCI field as the target spatial relation parameter set.

For example, the UE obtains the second field in the first signaling, where the second field is an antenna port field; based on an antenna port value indicated by the antenna port field, for example, the antenna port value is 2, and the correspondence shown in FIG. 6, determines that DMRS ports corresponding to the antenna port value 2 are (0, 1); and then determines a CDM group to which the DMRS ports (0, 1) belong.

For example, DMRS port CDM groups predefined in a protocol are as follows:
  DMRS type 1 (a maximum of eight ports are supported):
    DMRS ports {0, 1, 4, 5} belong to a CDM group 0, and
    DMRS ports {2, 3, 6, 7} belong to a CDM group 1; and
  DMRS type 2 (a maximum of 12 ports are supported):
    DMRS ports {0, 1, 6, 7} belong to a CDM group 0,
    DMRS ports {2, 3, 8, 9} belong to a CDM group 1, and
    DMRS ports {4, 5, 10, 11} belong to a CDM group 2.

In an embodiment, the UE may determine, based on the DMRS port numbers (0, 1), that the DMRS port numbers (0, 1) may belong to the CDM group 0 of the DMRS type 1 or the DMRS type 2, and then determine a DMRS type based on DMRS downlink Config of RRC signaling, for example, a DMRS belongs to the DMRS type 1. In this case, the UE determines that the DMRS port CDM group corresponding to the antenna port value 2 belongs to the CDM group 0 of the DMRS type 1, that is, determines that Table 4 of Table 4 and Table 5 is a valid association relationship table. Then the UE determines, based on a binary representation "00" of the CDM group 0, that the first spatial relation parameter is the TCI list 1 or TCI table 1 {TCI a1, TCI a2, ..., TCI a8} corresponding to "00".

In an embodiment, the TCI list 1 or the TCI table 1 is also referred to as a target relation parameter set.

Finally, in operation 1052, the UE determines the target spatial relation parameter in the target spatial relation parameter set based on the state value of the first field in the first signaling.

For example, the UE learns that the state value indicated by the first field in the first signaling is "00"; finds, by searching the target spatial relation parameter set TCI list 1 or TCI table 1, that a TCI state ID corresponding to "00" is a1; and further determines that a spatial relation parameter a1 in the first spatial relation is the target spatial relation parameter. The UE receives the PDSCH by using the TCI state ID a1.

(2) Determining Method for the "Case 2":

The base station configures an association relationship between a CORESET ID and a TCI state ID or a TCI table.

Table 6 shows an association relationship between a CORESET ID and a TCI state ID or a TCI table. The association relationship may be predefined in a protocol.

TABLE 6

| Value of a CORESET ID | TCI list/TCI table |
| --- | --- |
| CORESET ID 1 | TCI list 1 {TCI a1, TCI a2, ..., TCI a8}/ TCI table 1 |
| CORESET ID 2 | TCI list 2 {TCI b1, TCI b2, ..., TCI b8}/ TCI table 2 |
| ... | ... |
| CORESET ID n | TCI list 2 {TCI b6, TCI b10, ..., TCI b16}/ TCI table X |

The UE obtains the first signaling, and determines the first information based on the first signaling. The first information is the identifier (CORESET ID) of the CORESET to which the first signaling belongs.

That the UE determines a target spatial relation parameter set based on the at least one piece of signaling in operation 1051 specifically includes. The UE determines, based on the identifier of the CORESET to which the first signaling belongs and the association relationship shown in Table 6, a TCI list or a TCI table indicated by a current first field, and uses the TCI list or the TCI table as the target spatial relation parameter set. A spatial relation parameter included in the target spatial relation parameter set is the first spatial relation parameter.

For example, when the ID of the CORESET to which the first field of the first signaling belongs is 1, an associated first spatial relation parameter is the TCI list 1 or the TCI table 1; or when the ID of the CORESET to which the first field of the first signaling belongs is 2, an associated first spatial relation parameter is the TCI list 2 or the TCI table 2. In this embodiment, assuming that the ID of the CORESET to which the first field of the first signaling belongs is 2, the target spatial relation parameter set is the TCI list 2 or the TCI table 2, and the first spatial relation parameter is {TCI b1, TCI b2, . . . , TCI b8}.

Operation 1052 specifically includes: Based on the state value of the first field in the first signaling, for example, the state value is "001", and a TCI state ID that has a correspondence with the TCI state value "001" in the target spatial relation parameter set {TCI b1, TCI b2, . . . , TCI b8} is b2, the UE determines that the TCI state ID b2 is the target spatial relation parameter.

(3) Determining Method for the "Case 3":

Similarly, when the first information is the identifier of the search space set to which the first signaling belongs, the base station needs to configure an association relationship between a search space ID and a TCI state ID or a TCI table.

Table 7 shows an association relationship between a search space ID and a TCI state ID or a TCI table. The association relationship may be predefined in a protocol.

TABLE 7

| Value of a search space ID | TCI list or table/TCI list/TCI table |
| --- | --- |
| Search space ID 1 | TCI list 1 {TCI a1, TCI a2, ..., TCI a8}/ TCI table 1 |
| Search space ID 2 | TCI list 2 {TCI b1, TCI b2, ..., TCI b4}/ TCI table 2 |
| ... | ... |
| Search space ID n | TCI list n {TCI b1, TCI b10, ..., TCI b16}/ TCI table X |

Operation 1051 specifically includes: The UE determines, based on a value of the identifier of the CORESET to which the first signaling belongs and the association relationship shown in Table 7, that a TCI list or a TCI table indicated by a current first field is the target spatial relation parameter set. A spatial relation parameter included in the target spatial relation parameter set is the first spatial relation parameter.

For example, in this embodiment, assuming that the ID of the search space to which the first field of the first signaling belongs is a value 2, the target spatial relation parameter set is the TCI list 2 or the TCI table 2, and the first spatial relation parameter includes {TCI b1, TCI b2, ..., TCI b4} or {TCI b1, TCI b2, ..., TCI b8}.

Operation 1052 specifically includes: Based on the state value of the first field in the first signaling, for example, the state value is "001", and a TCI state ID that has a correspondence with the TCI state value "001" in the target spatial relation parameter set is b2, the UE determines that the TCI state ID b2 is the target spatial relation parameter.

(4) Determining Method for the Other Cases:

In the case 4 in which the first information is the DMRS port identifier indicated by the at least one second field in the first signaling, and the case 5 in which the first information is the codeword information indicated by the at least one second field in first signaling, the second information is used to configure a correspondence between the codeword and a spatial relation parameter. A process of determining the one or more target spatial relation parameters by the UE is described in detail in the following embodiments.

According to the method provided in this embodiment, the terminal receives the first signaling sent by the base station, where the state value of the first field is configured in the first signaling; and the terminal obtains the one or more target spatial relation parameters from a candidate spatial relation parameter or spatial relation parameter set based on an indication of the state value, and receives a channel by using the one or more target spatial relation parameters, to cope with an issue of spatial relation parameter indication in a scenario in which one piece of data is scheduled by each of a plurality of pieces of DCI signaling and data comes from different TRPs, an issue of spatial relation parameter indication in a scenario in which data scheduled by one piece of DCI signaling comes from different TRPs, or an issue of QCL information indication during multi-beam, multi-link, or multi-layer transmission.

In addition, in this method, at least one of the plurality of candidate state values of the first field corresponds to two or more spatial relation parameters. Therefore, compared with an existing method in which one state value corresponds to only one spatial relation parameter, flexibility of TCI information configuration is improved. In addition, an association relationship that one candidate state value corresponds to a plurality of spatial relation parameters is configured, thereby further reducing indication overheads. For example, originally, a four-bit space, for example, "0000", needs to be occupied for indicating 16 spatial relation parameters, but only a three-bit space is required when the 16 correspondences configured in this method are used. Therefore, according to the method provided in this embodiment, indication overheads can be reduced while flexibility of TCI information indication is ensured.

It can be understood that the embodiments of this application merely describe, as an example, a case in which one or more spatial relation parameters are TCI states, and other target spatial relation parameters may be alternatively included. For example, the TCI state in this embodiment may be replaced with QCL or a reference signal having a QCL relationship with the first channel. For example, in the embodiments of this application, if the UE obtains the first information and determines QCL information currently indicated to the UE, and the QCL information includes two reference signals RSs, for example, an RS 1 and an RS 9, the target spatial relation parameters are the RS 1 and the RS 9, and the UE receives the first channel based on the RS 1 and the RS 9.

Similarly, for a TCI state, one TCI ID may include two reference signals, for example, an RS 1 and an RS 2, separately used to indicate transmission of different beams, and may be used in a single-TRP or multi-TRP scenario.

In addition, it can be understood that the reservation is specific to the antenna port value. A DMRS port number, a quantity of DMRS CDM groups, a quantity of codewords, or the like is temporarily not filled, and a specific value is filled during subsequent determining or setting. In addition, after the specific value is filled, one or more target spatial relation parameters may be determined based on a correspondence.

Embodiment 2

This embodiment is similar to Embodiment 1. A difference lies in: For the second signaling sent by the base station in operation 102, at least two spatial relation parameters in at least one of the M spatial relation parameter sets configured by using the second signaling correspond to at least one of the plurality of candidate state values of the first field. For example, a state value "000" of a TCI field corresponds to TCI state IDs c1 and c9.

In this case, data scheduled by one piece of DCI comes from two different TRPs, that is, a non-coherent joint transmission (NCJT) scenario. In this scenario, a process of configuring an association relationship by a base station and determining a target spatial relation parameter by UE specifically includes the following operations.

Figure 7:
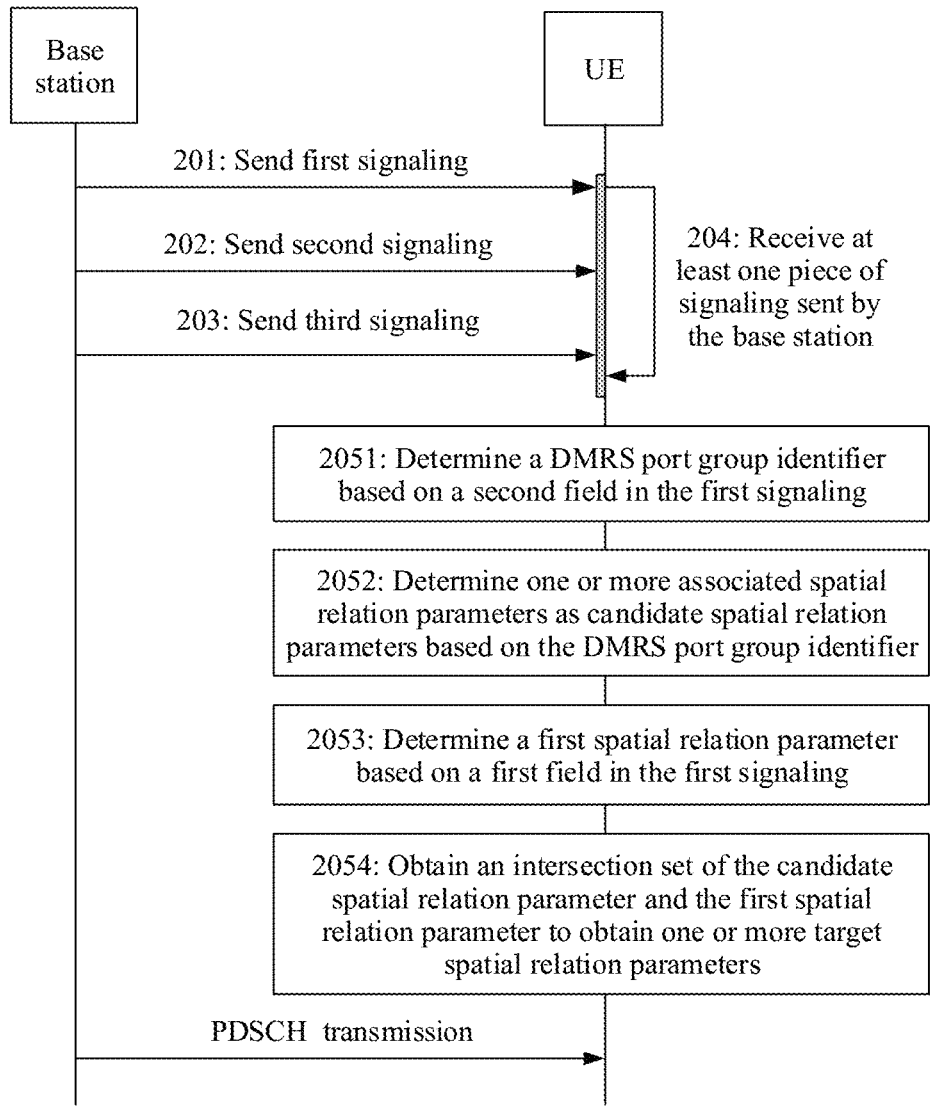
FIG. 7 is a signaling flowchart of another data transmission method according to an embodiment of this application.

Refer to FIG. 7. Operation 201: A base station sends first signaling.

This operation is the same as operation 101 in Embodiment 1, and details are not described herein again.

Operation 202: The base station sends second signaling.

In operation 202, the base station configures M spatial relation parameter sets by using the second signaling. The M spatial relation parameter sets include P second spatial relation parameters and Q third spatial relation parameters.

Further, there is a correspondence between the P second spatial relation parameters and a first value, and there is a correspondence between the Q third spatial relation parameters and a second value.

The first value and the second value are any one of the following: a DMRS port number, an identifier of a group to which a DMRS port belongs, or codeword information that is indicated by a second field; an identifier of a control resource set; an identifier of a search space set; or an antenna panel identifier.

For example, a specific configuration manner is shown in Table 8, Table 9, and Table 10. Table 8 shows eight (P=8) second spatial relation parameters, and TCI state IDs a1 to a8 of the spatial relation parameters are used to indicate beam transmission from a TRP 1. Table 9 shows eight (Q=8) third spatial relation parameters, and TCI state IDs b1 to b8 of the spatial relation parameters are used to indicate beam transmission from a TRP 2. Table 10 shows eight groups of fourth spatial relation parameters, and each group of fourth spatial relation parameters includes two TCI state IDs that may be used to indicate beam transmission from two TRPs.

TABLE 8

| State value of a TCI field/ Value of TCI field | TCI state ID/ TCI state ID |
| --- | --- |
| 000 | TCI state ID a1 |
| 010 | TCI state ID a2 |
| ... | ... |
| 111 | TCI state ID a8 |

TABLE 9

| State value of a TCI field/ Value of TCI field | TCI state ID/ TCI state ID |
| --- | --- |
| 000 | TCI state ID b1 |
| 010 | TCI state ID b2 |
| ... | ... |
| 111 | TCI state ID b8 |

TABLE 10

| State value of a TCI field/ Value of TCI field | TCI state ID/ TCI state ID |
| --- | --- |
| 000 | TCI state ID c1 + c9 |
| 001 | TCI state ID c2 + c10 |
| ... | ... |
| 111 | TCI state ID c8 + c16 |

In an embodiment, in correspondences in Table 8 and Table 9, a quantity of TCI state IDs corresponding to each candidate state value may be 2. As shown in Table 10, a quantity of TCI state IDs corresponding to one candidate state value may be 2, 3, or more. A specific quantity may be determined through configuration by the base station.

This embodiment describes a method for selecting a target spatial relation parameter in a case in which one candidate state value corresponds to two empty TCI state IDs, as shown in Table 10.

In an embodiment, the M spatial relation parameter sets configured by the base station based on the second signaling are three spatial relation parameter sets, that is, M=3. A spatial relation parameter set {TCI a1, TCI a2, . . . , TCI a8} including eight second spatial relation parameters, as shown in Table 8, corresponds to spatial relation parameter indication information of a single TRP 1. A spatial relation parameter set {TCI b1, TCI b2, . . . , TCI b8} including eight third spatial relation parameters, as shown in Table 9, corresponds to spatial relation parameter indication information of a single TRP 2. In addition, a spatial relation parameter set {TCI c1+c9, TCI c2+c10, . . . , TCI c8+c6} including eight groups of fourth spatial relation parameters, as shown in Table 10, corresponds to spatial relation parameter indication information of two TRPs.

There is an optional operation. Operation 203: The base station sends third signaling.

Operation 204: UE receives at least one piece of signaling sent by the base station. The at least one piece of signaling includes the first signaling, the second signaling, and/or the third signaling.

Operation 203 and operation 204 are the same as operation 103 and operation 104 in Embodiment 1, and details are not described herein again.

Operation 205: The UE determines one or more target spatial relation parameters in a first spatial relation parameter. This operation includes:

According to the case 1, the case 2, and the case 3, a specific determining process is as follows.

(1) Determining Method for the "Case 1":

A possible embodiment includes:

The first spatial relation parameter includes one second spatial relation parameter (a TCI a1), one third spatial relation parameter (a TCI b1), and one group of fourth spatial relation parameters (TCIs c1 and c9).

In a transmission scenario with a single TRP 1, the target spatial relation parameter is determined based on a transport block field and an antenna port field.

Specifically, if the UE learns, through parsing, that a quantity of codewords is 1 or 2 (one CW or two CWs), a value of the antenna port field is 0 to 3, and a value of a DMRS port CDM group identifier indicated by the antenna port field is a first value "00", the target spatial relation parameter is the second spatial relation parameter, for example, the TCI a1.

In a transmission scenario with a single TRP 2, the target spatial relation parameter is determined based on a transport block field and an antenna port field.

Specifically, if the UE learns, through parsing, that a quantity of codewords is 1 or 2 (one CW or two CWs), the antenna port field is 0 to 3, and a value of a DMRS port CDM group identifier indicated by the antenna port field is a second value "01", the target spatial relation parameter is the third spatial relation parameter, for example, the TCI b1.

In a multi-TRP transmission scenario, the target spatial relation parameter is determined based on a transport block field and an antenna port field.

Specifically, if the UE learns, through parsing, that a quantity of codewords is 2 (two CWs), when the antenna port field is 4 to 31, if a quantity of values of a DMRS port CDM group identifier is greater than 1, the target spatial relation parameter is the fourth spatial relation parameters, for example, the TCIs c1 and c9.

Details are further described.

The base station configures an association relationship between a TCI state ID and a value of an identifier of a CDM group to which a DMRS port belongs. The identifier of the CDM group to which the DMRS port belongs may be represented by a DMRS port CDM group. For example, an association relationship between a DMRS port CDM group and a TCI state ID or a TCI table is represented by binary "0/1". Table 11 and Table 12 show relationships for a single TRP.

TABLE 11

| Value of a DMRS port CDM group | TCI list/table |
|---|---|
| 00 | TCI list x1 {TCI a1, TCI a2, . . . , TCI a8}/table 1 |
| 01 | TCI list x2 {TCI b1, TCI b2, . . . , TCI b8}/table 2 |

Referring to Table 11, when a DMRS type (DMRS type) is 1, a maximum of two DMRS port CDM groups are indicated to the UE. "00" represents the first value, "01" represents the second value, and the first value corresponds to second spatial relation parameters, including the TCIs a1 to a8. In an embodiment, a set including the associated second spatial relation parameters is expressed as a "TCI list x1" or a "TCI table 1".

Similarly, "01" represents the second value, and the second value corresponds to third spatial relation parameters, including spatial relation parameters TCIs b1 to b8. In an embodiment, a set including the associated third spatial relation parameters is expressed as a "TCI list x2" or a "TCI table 2".

It should be noted that, for a relationship between a "TCI list x" and a "TCI table", the "TCI list x" may be a subset of the "TCI table", or may be the same as the "TCI table", or may have an intersection set with some TCI IDs in the TCI table. This is not limited in this application.

In addition, the association relationship may be alternatively shown in Table 12. Table 12 shows a correspondence between a value of a DMRS port CDM group and one or more spatial relation parameters TCI IDs/TCI tables in a multi-TRP transmission scenario.

TABLE 12

| Value of a DMRS port CDM group | TCI list/table |
|---|---|
| 00 | TCI list x1 {TCI c1, TCI c2, . . . , TCI c8} |
| 01 | TCI list x2 {TCI c9, TCI c10, . . . , TCI c16} |

Similarly, when a DMRS type is 2, through configuration by the base station, correspondences between a maximum of three values and TCI state IDs are indicated to the UE, that is, in addition to the first value and the second value, a third value is further included. In an embodiment, the third value is "10".

Table 13 and Table 14 show relationships between a value of a DMRS port CDM group and each spatial relation parameter when a DMRS type is 2 in a single-TRP scenario and a multi-TRP scenario, respectively.

TABLE 13

| Value of a DMRS port CDM group | TCI list/table |
|---|---|
| 00 | TCI list x1 {TCI a1, TCI a2, . . . , TCI a8}/TCI table 1 |
| 01 | TCI list x2 {TCI b1, TCI b2, . . . , TCI b4} |
| 10 | TCI list x3 {TCI b5, TCI b6, . . . , TCI b8} |

TABLE 14

| Value of a DMRS port CDM group | TCI list/table |
|---|---|
| 00 | TCI list x1 {TCI c1, TCI c2, . . . , TCI c8} |
| 01 | TCI list x2 {TCI c9, TCI c10, . . . , TCI c12} |
| 10 | TCI list x3 {TCI c13, TCI c14, . . . , TCI c20} |

A specific process includes the following operations.

Operation 2051: The UE determines a DMRS port group identifier based on a second field in the first signaling.

Operation 2052: The UE determines one or more associated spatial relation parameters as candidate spatial relation parameters based on the DMRS port group identifier.

Operation 2053: The UE determines the first spatial relation parameter based on a first field in the first signaling.

Operation 2054: The UE obtains an intersection set of the candidate spatial relation parameter and the first spatial relation parameter to obtain one or more target spatial relation parameters.

For example, in operation 2051, the UE learns that a second field in the first signaling is an antenna port field. A value of the antenna port field is 10, and according to Table 5 in Embodiment 1, DMRS port numbers corresponding to the antenna port value 10 are 0 to 3.

In operation 2052, a CDM group to which the port numbers 0 to 3 belong is determined based on DMRS port CDM groups predefined in a protocol.

For example, the protocol stipulates the following:
DMRS type 1 (a maximum of eight ports are supported):
  DMRS ports {0, 1, 4, 5} belong to a CDM group 0, and
  DMRS ports {2, 3, 6, 7} belong to a CDM group 1; and
DMRS type 2 (a maximum of 12 ports are supported):
  DMRS ports {0, 1, 6, 7} belong to a CDM group 0,
  DMRS ports {2, 3, 8, 9} belong to a CDM group 1, and
  DMRS ports {4, 5, 10, 11} belong to a CDM group 2.

In this case, the UE determines, according to the foregoing stipulation, that the DMRS port numbers 0 to 3 belong to the CDM group 0 or 1. Further, whether the CDM group 0 or 1 belongs to the DMRS type 1 or 2 may be determined by using DCI configured by the base station. For example, the base station notifies the UE that a current DMRS type is 2 and multi-TRP data transmission is supported. In this case, the UE may determine, according to the correspondence in Table 14, that candidate spatial relation parameters associated with the CDM group 0 are the TCI list x1 {TCI c1, TCI c2, . . . , TCI c8}, and candidate spatial relation parameters associated with the CDM group 1 are the TCI list x2 {TCI c9, TCI c10, . . . , TCI c12}.

The CDM group "0" is configured in the association relationship in Table 14 by using binary "00", and the CDM group "1" is configured in the association relationship in Table 14 by using binary "01".

In operation 2053, the UE determines the first spatial relation parameter based on the first field in the first signaling. For example, if the first field in the first signaling is "000", it is determined, according to the correspondence in Table 10, that first spatial relation parameters corresponding to the state value "000" are TCI state IDs c1 and c9.

In operation 2054, the UE obtains an intersection set of the candidate spatial relation parameters TCI list x1 {TCI c1, TCI c2, . . . , TCI c8} and {TCI c9, TCI c10, . . . , TCI c12} and the first spatial relation parameters TCIs ci and c9, and common spatial relation parameters are c1 and c9. In this case, the UE determines that target spatial relation parameters indicated by the state value 000 of the first field are the TCIs c1 and c9.

It should be noted that, in this embodiment, a sequence of performing operation 2051 and operation 2053 is not specifically limited. To be specific, operation 2051 and operation 2053 may be performed simultaneously or sequentially. For example, operation 2053 is performed before operation 2051 and operation 2052.

It can be understood that, in this embodiment, the target spatial relation parameter may be alternatively determined by indicating another value by using DCI. For example, DCI information received by the UE indicates that an antenna port value is 2, and the UE determines that DMRS ports corresponding to the antenna port value 2 are (0, 1), and belong to the CDM group 0 and the DMRS type 1. The UE determines, based on the CDM group 0, to use the TCI list x1 or table 1 shown in Table 13. Finally, the UE learns, through parsing based on the TCI state ID a1 corresponding to the state value "000" of the first field in the first signaling, that the target spatial relation parameter is the TCI a1.

Operation 206: The UE receives the first channel based on the target spatial relation parameter.

Specifically, the UE receives, by using the TCI state ID c1, PCSCH data corresponding to the CDM group 0; and receives, by using the TCI state ID c9, PCSCH data corresponding to the CDM group 1.

Alternatively, the UE receives PDSCH data by using the TCI state ID a1.

In an embodiment, for methods for determining a target spatial relation parameter in the other cases, refer to the determining processes in Embodiment 1. This is not limited in this embodiment.

According to the method provided in this embodiment, in a scenario in which data scheduled by one piece of DCI signaling comes from a plurality of TRPs, target spatial relation parameters supporting single-TRP transmission and multi-TRP transmission are indicated by using the first signaling and the third signaling without increasing bit overheads of DCI, so that TCI information is comparatively flexible, without increasing overheads of indication information.

In an embodiment, the M spatial relation parameter sets configured by the base station based on the second signaling in operation 202 may alternatively include two spatial relation parameter sets, that is, M=2, for example, as shown in Table 15 and Table 10.

TABLE 15

| State value of a TCI field/<br>Value of TCI field | TCI state ID/<br>TCI state ID |
|---|---|
| 000 | TCI state ID a1 |
| ... | ... |
| 011 | TCI state ID a4 |
| 100 | TCI state ID b1 |
| ... | ... |
| 111 | TCI state ID b4 |

In Table 15, indicated candidate state values of a TCI field include a total of eight state values: "000" to "111", which respectively correspond to eight TCI state IDs. The TCI state IDs a1 to a4 may correspond to beam transmission from a TRP 1. The TCI state IDs b1 to b4 may correspond to beam transmission from a TRP 2. For a specific transmission scenario, refer to FIG. 2C.

A specific determining manner includes: The first spatial relation parameter includes a second spatial relation parameter (a TCI a1) and a third spatial relation parameter (TCIs c1 and c9).

In a transmission scenario with a single TRP 1, the target spatial relation parameter is determined based on a transport block field and an antenna port field.

Specifically, if the UE learns, through parsing, that a quantity of codewords is 1 or 2 (one CW or two CWs), a value of the antenna port field is 0 to 3, and a quantity of values of a DMRS port CDM group identifier indicated by the antenna port field is 1, the target spatial relation parameter is the second spatial relation parameter, for example, the TCI a1.

In a multi-TRP transmission scenario, the target spatial relation parameter is determined based on a transport block field and an antenna port field:

Specifically, if the UE learns, through parsing, that a quantity of codewords is 2 (two CWs), when the antenna port field is 4 to 31, if a CDM group is greater than 1, the target spatial relation parameter is the fourth spatial relation parameter, for example, the TCIs c1 and c9.

It should be noted that, in the embodiments of this application, different channel receiving manners are indicated based on different forms of target spatial relation parameters. In addition to the manner, indicated in this embodiment, of receiving the first channel based on the TCI state ID, the following manners may be alternatively used.

In an embodiment, the first spatial relation parameter is a TCI state ID. When the TCI state ID indicates one or more pieces of quasi-colocation (QCL) assumption information, the UE may determine the target spatial relation parameter based on the one or more pieces of QCL information. For example, the TCI state ID includes QCL 1 and QCL 2, and the QCL 1 and the QCL 2 may correspond to a TRP 1 and a TRP 2 respectively. In this case, the UE may receive data of a corresponding channel based on indications of the QCL 1 and the QCL 2.

In an embodiment, the target spatial relation parameter is one or more of K RSs indicated by QCL information. For example, the QCL information indicates that two spatial relation parameters are an RS 1 and an RS 2 that correspond to transmission from two different TRPs. In this case, the UE may perform a beamforming or reception processing process on a receive side based on the QCL information. It should be understood that the UE may further receive a target reference signal based on receive beam information, indicated by the QCL information, of a source reference signal.

In a TCI, QCL, and RS configuration manner in an existing protocol, one TCI ID indicates one TCI state, and information about the TCI state is as follows:

```
TCI-State ::= SEQUENCE {
    tci-StateId      TCI-StateId,
    qcl-Type1        QCL-Info,
    qcl-Type2        QCL-Info        OPTIONAL,
    -- Need R        ...
}
QCL-Info ::= SEQUENCE {
    cell ServCellIndex
    bwp-Id      BWP-Id
    RS          RS-Index
    },
    qcl-Type ENUMERATED {typeA, typeB, typeC, typeD},
    ...
}
```

When each TCI indicates one piece of QCL information, the information may be one or more of a plurality of types, and each type of QCL information includes only one reference signal. For example, the QCL information indicates a TCI ID, and the TCI ID a1 in this embodiment of this application may be a reference signal RS 1.

In addition, a case of a plurality of spatial relation parameters may be obtained through extension.

For example, in a manner 1, one state value of a TCI field is associated with two TCI IDs, and a TCI state indicated by each TCI ID is the same as that in an existing protocol.

In a manner 2, one state value of a TCI field is associated with one TCI ID, a TCI state indicated by the TCI ID includes one piece of QCL information, the QCL information may be one or more of the foregoing QCL type A to type D, and each type of QCL information includes a plurality of reference signals.

In a manner 3, one state value of a TCI field is associated with one TCI ID, a TCI state indicated by the TCI ID includes two pieces of QCL information, the QCL information may be one or more of the foregoing QCL type A to type D, and each type of QCL information includes only one reference signal.

Embodiment 3

This embodiment further provides another information transmission method, used to indicate to select a target spatial relation parameter for current scheduling in a scenario in which data scheduled by one piece of DCI comes from one or more TRPs.

Specifically, the method provided in this embodiment may be used in a dynamic point selection (DPS) or NCJT technical scenario. In addition, one piece of DCI signaling schedules one piece of data, and the data may come from different TRPs, that is, an NCJT transmission mode. Alternatively, one piece of data scheduled by one piece of DCI signaling may come from one TRP, or may come from another dynamic TRP.

This embodiment describes the "case 1" in Embodiment 1 and Embodiment 2. A difference from the foregoing embodiments lies in: In the M spatial relation parameter sets configured by the base station, each candidate state value of the first field may indicate at least one TCI state ID, and the at least one TCI state ID may support a single TRP or a plurality of TRPs.

For example, in operation 102 in Embodiment 1 or operation 202 in Embodiment 2, the base station sends the second signaling, and the second signaling is used to indicate a TCI state table or a TCI state set of candidate QCL of a PDSCH. In the M spatial relation parameter sets configured in this embodiment, M=1, as shown in Table 16.

TABLE 16

| State value of a TCI field/ Value of TCI field | TCI state ID/ TCI state ID |
| --- | --- |
| 000 | TCI state ID c1 + c9 |
| 001 | TCI state ID c2 + c10 |
| ... | ... |
| 111 | TCI state ID c8 + c16 |

Table 16 shows an association relationship between each candidate state value of a TC field and two TCI IDs. The two TCI IDs may support beam transmission from a single TRP or a plurality of TRPs.

In addition, an association relationship between a candidate state value of a TCI field and a TCI ID is further included, that is, a TCI ID is directly indicated, for example, the association relationship is used to indicate that CDM groups to which two DMRS ports from one TRP belong share one piece of QCL.

It should be noted that the association relationship may be a direct association relationship, or may be an indirect association relationship. The indirect association relationship is an association relationship obtained by using one or more other intermediate variables, for example, the intermediate variable is a TRP ID or a cell ID.

Then the UE receives at least one piece of signaling sent by the base station, including first signaling, second signaling, and third signaling. Content of the first signaling and the third signaling is the same as that in Embodiment 1 and Embodiment 2, and details are not described herein again.

A process of determining, by the UE, one or more spatial relation parameters as the target spatial relation parameter is as follows.

The base station configures an association relationship between a DMRS port CDM group and a TCI state ID by using the third signaling. In an embodiment, the association relationship may be alternatively predefined in a protocol, as shown in Table 17 and Table 18 (the association relationship includes but is not limited to representations in the following tables).

When a DMRS type is 1, a maximum of two values of DMRS port CDM groups are indicated to the UE, and the association relationship is shown in the following table.

TABLE 17

| Value of a DMRS port CDM group | TCI list/table |
| --- | --- |
| 00 | TCI list C1 {TCI c1, TCI c2, ..., TCI c8} |
| 01 | TCI list C2 {TCI c9, TCI c10, ..., TCI c16} |

When a DMRS type is 2, a maximum of three DMRS port CDM groups are indicated to the UE, and the association relationship is shown in the following table.

TABLE 18

| Value of a DMRS port CDM group | TCI list/table |
| --- | --- |
| 00 | TCI list 1 {TCI c1, TCI c2, ..., TCI c8} |
| 01 | TCI list 2 {TCI c9, TCI c10, ..., TCI c12} |
| 10 | TCI list 3 {TCI c13, TCI c14, ..., TCI c16} |

In an embodiment, in the association relationships configured in the foregoing tables, some TCI IDs associated with DMRS port CDM groups may be the same, for example, the TCI c1=the TCI c12.

In an embodiment, any TCI IDs associated with DMRS port CDM groups in the foregoing tables are different.

In an embodiment, a quantity of TCI IDs associated with each DMRS port CDM group in the foregoing tables may be greater than a quantity of TCI IDs associated with a TCI table.

In an embodiment, the third signaling (DCI signaling) sent by the base station includes a TCI field used to indicate beam information for receiving data.

In an embodiment, the third signaling may be the first signaling.

In an embodiment, the DCI signaling (for example, the third signaling) further includes a second field, for example, a transport block field, used to indicate codeword (codeword, CW) information, for example, a quantity of codewords.

In an embodiment, the second field in the DCI signaling further includes an antenna port field, used to indicate DMRS port information, as shown in Table 5 in Embodiment 1.

Specifically, a determining process includes the following operations.

The UE determines, based on at least one second field in the third signaling and a protocol-predefined relationship between a DMRS port and a DMRS port CDM group, a number Z of a CDM group to which a DMRS port of a PDSCH scheduled by current DCI belongs. Based on a state value X of a TCI field in the first signaling, where the state value X corresponds to at least one spatial relation parameter, and the association relationship shown in Table 16, the UE determines a TCI ID X1 and a TCI ID X2 that correspond to the state value X. Then the UE determines, based on the association relationship in Table 17 or Table 18 and the CDM group number Z, that the CDM group Z is associated with the TCI ID X2, and the UE determines that a valid TCI ID is X2. Finally, the UE receives the PDSCH based on the TCI ID X2.

In an embodiment, an antenna port field value carried in the second field in the third signaling is 2, and a state value of the first field in the first signaling is 0, which is represented as "000" in a binary form. In this case, it is determined, based on the foregoing relationship, that DMRS port numbers corresponding to the antenna port value 2 are (0, 1).

Further, DMRS port number CDM groups predefined in a protocol are as follows: DMRS type 1 (a maximum of eight ports are supported): DMRS ports {0, 1, 4, 5} belong to a CDM group 0, and DMRS ports {2, 3, 6, 7} belong to a CDM group 1; and DMRS type 2 (a maximum of 12 ports are supported): DMRS ports {0, 1, 6, 7} belong to a CDM group 0, DMRS ports {2, 3, 8, 9} belong to a CDM group 1, and DMRS ports {4, 5, 10, 11} belong to a CDM group 2.

The UE determines that the current DMRS ports (0, 1) belong to the CDM group 0. The UE determines a used TCI table based on the CDM group 0, parses the state value, and learns that a TCI state ID associated with the state value is c1. The UE receives the PDSCH by using a beam corresponding to the TCI ID c1. When the DMRS ports indicated by the antenna port field belong to the CDM group 1, it is determined that the UE is to receive the PDSCH by using a beam corresponding to a TCI ID c9.

Table 20 shows a case in which, when DMRS ports indicated by an antenna port field belong to a CDM group 0 and a CDM group 1, it is determined that TCI IDs are c1 and c9.

TABLE 20

| Base station side | | UE side | | |
|---|---|---|---|---|
| TCI state | Gnb configure | CDM group 0 + 1 | CDM group 0 {port . . . } | CDM group 1 {port . . . } |
| 000 | TCI c1 + c9 | TCI c1 + c9 | TCI c1 | TCI c9 |
| 001 | TCI c2 + c10 | TCI c2 + c10 | TCI c2 | TCI c10 |

TABLE 20-continued

| Base station side | | UE side | | |
|---|---|---|---|---|
| TCI state | Gnb configure | CDM group 0 + 1 | CDM group 0 {port . . . } | CDM group 1 {port . . . } |
| 010 | TCI c3 + c11 | TCI c3 + c11 | TCI c3 | TCI c11 |
| 011 | TCI c4 + c12 | TCI c4 + c12 | TCI C4 | TCI c12 |
| . . . | . . . | . . . | . . . | |

According to the method provided in this embodiment, when data scheduled by one piece of DCI comes from different TRPs, the UE obtains a current valid target TCI state ID by using at least one antenna port field or transport block field in the first signaling and a relationship between a DMRS port CDM group and a TCI ID, and with reference to an association relationship between one or more spatial relation parameter sets and a candidate state value, semi-statically configured by the base station, of the first field; and uses the target TCI state ID as a target spatial relation parameter for transmitting a beam. In this method, flexibility of TCI information indication is ensured, without increasing overheads of indication information.

Embodiment 4

A method provided in this embodiment differs from that in the foregoing embodiment mainly in operation 105: When the UE determines the one or more target spatial relation parameters in the first spatial relation parameter, the UE needs to determine the target spatial relation parameter based on the first information.

Technical scenarios in which this embodiment is used include but are not limited to a DPS scenario and an NCJT scenario.

The following describes in detail the method provided in this embodiment.

The method includes the following operations.

UE receives at least one piece of signaling sent by a base station. The at least one piece of signaling includes first signaling, second signaling, and third signaling.

The first signaling includes a first field. The first field includes a target state value. The target state value is used to indicate a first spatial relation parameter for receiving a first channel. In an embodiment, the first field is a TCI field, and the target state value is any one of 000, 001, 010, 011, 100, 101, 110, and 111.

In addition, the first signaling further includes first information, and the first information is at least one second field in the first signaling. In an embodiment, the second field is a transport block field or an antenna port field.

Further, the transport block field is used to determine information about a quantity of codewords (CW) included in a PDSCH currently scheduled by the first signaling.

In an embodiment, the antenna port field and the information about the quantity of codewords may be used to determine whether the PDSCH currently scheduled by the first signaling comes from a single TRP or a plurality of TRPs.

Further, the UE determines, based on the first information, one or more target spatial relation parameters in the first spatial relation parameter. This operation includes the following possible embodiments.

First Possible Embodiment

Referring to Table 21, the first spatial relation parameter includes a second spatial relation parameter and a third spatial relation parameter. For a case configured by the base station in which a state value of a TCI field corresponds to two TCI state IDs, the following is stipulated:

when the quantity of codewords is 1, the target spatial relation parameter is the second spatial relation parameter; and/or when the quantity of codewords is 2, the target spatial relation parameter includes the second spatial relation parameter and the third spatial relation parameter, where a first CW is received based on the second spatial relation parameter, and a second CW is received based on the third spatial relation parameter.

For example, the state value of the TCI in the first signaling is "000". When the UE learns, through parsing based on the transport block field, that the quantity of CWs is 1, the UE receives the first channel by using a second spatial relation parameter TCI c1 by default. When the quantity of CWs is 2, the second spatial relation parameter TCI c1 is used for receiving the first channel by default, and a third spatial relation parameter TCI c5 is used for receiving the first channel. In this case, the target spatial relation parameter includes the TCIs c1 and c5.

A TCI ID value parsed out by the UE is shown in Table 21. The TCI ID is used for receiving a PDSCH.

TABLE 21

| Base station side | | UE side | |
|---|---|---|---|
| Value of TCI field | Gnb configure | When a quantity of codewords is 1 | When a quantity of codewords is 2 |
| 000 | TCI c1 + c5 | TCI c1 | TCI c1 (CW 1) + TCI 5 (CW 2) |
| 001 | TCI c2 + c6 | TCI c2 | TCI c2 (CW 1) + TCI 6 (CW 2) |
| 010 | TCI c3 + c7 | TCI c3 | TCI c3 (CW 1) + TCI 7 (CW 2) |
| 011 | TCI c4 | TCI c4 | TCI c4 |
| ... | ... | ... | ... |

In Table 21, the TCI state ID c1 is abbreviated as the "TCI c1", the CW 1 represents the $1^{st}$ codeword, and the CW 2 represents the $2^{nd}$ codeword.

Second Possible Embodiment

For a case configured by the base station in which a candidate state value of a TCI field corresponds to two TCI state IDs, in a scenario in which two codewords are specific to a single TRP or a plurality of TRPs (NCJT), the following is stipulated:

when the quantity of codewords is 1, it is determined that the target spatial relation parameter is the second spatial relation parameter;

when the quantity of codewords is 2 and a value of the antenna port field is 0 to 3 (single-TRP), the target spatial relation parameter is the second spatial relation parameter, where a CW 1 is received based on the second spatial relation parameter, and a CW 2 is received based on the second spatial relation parameter; or when the quantity of codewords is 2 and a value of the antenna port field is 4 to 31 (multi-TRP), the target spatial relation parameter includes the second spatial relation parameter and the third spatial relation parameter, where a CW 1 is received based on the second spatial relation parameter, and the CW 2 is received based on the second spatial relation parameter.

For example, when the quantity of codewords is 1, a TCI c1 in TCI IDs associated with a TCI state value "000" indicated by the TCI field in the first signaling is used by default, and the TCI c1 is the target spatial relation parameter.

When the quantity of codewords is 2, one or more target spatial relation parameters are determined based on an antenna port number indicated by the antenna port field.

A TCI ID value parsed out by the UE is shown in Table 22. The TCI ID is used for receiving a PDSCH.

TABLE 22

| Base station side | | UE side | | |
|---|---|---|---|---|
| Value of TCI field | Gnb configure | When a quantity of codewords is 1 (single-TRP) | When a quantity of codewords is 2 (NCJT) | When a quantity of codewords is 1 (single-TRP) |
| 000 | TCI c1 + c5 | TCI c1 | TCI c1 (CW 1) + TCI 5 (CW 2) | TCI c1 (CW 1) + TCI 1 (CW 2) |
| 001 | TCI c2 + c6 | TCI c2 | TCI c2 (CW 1) + TCI 6 (CW 2) | TCI c2 (CW 1) + TCI 2 (CW 2) |
| 011 | TCI c5 | TCI c5 | TCI c5 | TCI c5 |
| 100 | TCI c6 | TCI c6 | TCI c6 | TCI c6 |
| ... | ... | ... | ... | ... |

A multi-TRP (for example, NCJT) scenario and a single-TRP scenario may be distinguished in the following manner. With reference to FIG. 8, for example, the following cases may indicate the NCJT scenario:

for a DMRS type 1, a maximum length is 2, and an antenna port field value is at least one of {4 to 31};

for a DMRS type 2, a maximum length is 1, and an antenna port field value is at least one of {2 to 31}; or for a DMRS type 2, a maximum length is 2, and an antenna port field value is at least one of {6 to 63}.

Other states may indicate the single-TRP scenario.

An alternative embodiment includes:

when the quantity of codewords is 1, the target spatial relation parameter is the first spatial relation parameter, for example, the TCI c6;

when the quantity of codewords is 2 and a value of the antenna port field is 0 to 3 (single-TRP), the target spatial relation parameter is the second spatial relation parameter, where a CW 1 is received based on the second spatial relation parameter, and a CW 2 is received based on the second spatial relation parameter; or when the quantity of codewords is 2 and a value of the antenna port field is 4 to 31 (multi-TRP), the target spatial relation parameter includes the second spatial relation parameter and the third spatial relation parameter, where a CW 1 is received based on the second spatial relation parameter, and the CW 2 is received based on the third spatial relation parameter.

Third Possible Embodiment

The UE determines one or more spatial relation parameters in the first spatial relation parameter based on two second fields in the first signaling. The two second fields are an antenna port field and a transport block field.

Specifically, this method includes: The UE determines CW quantity information based on the transport block field, and then determines the target spatial relation parameter based on the antenna port field and the second information in the foregoing embodiment. The second information is used to configure a correspondence between the first information and the one or more spatial relation parameters.

In an embodiment, this method is applicable to an NCJT scenario with different CWs.

Specifically, the first spatial relation parameter includes a second spatial relation parameter and a third spatial relation parameter (a TCI 5).

For example, when the quantity of codewords is 1, by default, all DMRS antenna ports use a TCI ID indicated by the base station, without distinguishing between DMRS port CDM groups, that is, CDM groups to which DMRS ports belong all use the TCI ID indicated by the base station for receiving a channel. This may correspond to a single-TRP single-beam transmission scenario. For example, the target spatial relation parameter is a TCI c4.

When the quantity of codewords is 2, the target spatial relation parameter may be parsed out and determined according to the method in Embodiment 3.

For example, when the quantity of codewords is 2 and a DMRS CDM group identifier is a first value 00, the target spatial relation parameter is the second spatial relation parameter, where a CW 1 is received based on the second spatial relation parameter, and a CW 2 is received based on the second spatial relation parameter.

When the quantity of codewords is 2 and a DMRS CDM group identifier is a second value 01, the target spatial relation parameter is the third spatial relation parameter, where a CW 1 is received based on the third spatial relation parameter, and a CW 2 is received based on the third spatial relation parameter.

When the quantity of codewords is 2 and a DMRS CDM group identifier includes a first value 00 and a second value 01, the target spatial relation parameter includes the second spatial relation parameter and the third spatial relation parameter, where a CW 1 is received based on the second spatial relation parameter, and a CW 2 is received based on the third spatial relation parameter.

For example, a TCI ID value parsed out by the UE is shown in Table 23. The TCI ID is used for receiving a PDSCH.

TABLE 23

| Base station side | | | UE side | | |
| --- | --- | --- | --- | --- | --- |
| | | | | Two codewords | |
| Value of TCI field | Gnb configure | One codeword | CDM group 0 + 1 {port . . . } | CDM group 0 {port . . . } | CDM group 1 {port . . . } |
| 000 | TCI c1 + c5 | TCI c1 + c5 | TCI c1 + c5 | TCI c1 | TCI c5 |
| 001 | TCI c2 + c6 | TCI c2 + c6 | TCI c2 + c6 | TCI c2 | TCI c6 |
| 010 | TCI c3 + c7 | TCI c3 + c7 | TCI c3 + c7 | TCI c3 | TCI c7 |
| 101 | TCI c4 | TCI c4 | TCI c4 | TCI c4 | TCI c4 |
| ... | | | | | |

Further, in this method, when the quantity of codewords is 2, a method for determining one or more spatial relation parameters TCI IDs may be further limited. As shown in FIG. 8, for example, the following cases may indicate an NCJT scenario:

for a DMRS type 1, a maximum length is 2, and an antenna port field value is at least one of {4 to 31};

for a DMRS type 2, a maximum length is 1, and an antenna port field value is at least one of {2 to 31}; or for a DMRS type 2, a maximum length is 2, and an antenna port field value is at least one of {6 to 63}.

This embodiment provides three methods for determining the target spatial relation parameter based on the first information. The UE first determines the quantity of codewords by using the transport block field indicated by the second field, and then determines, based on a preconfigured association relationship between each codeword and a TCI ID, a TCI ID used for each codeword, so that the UE can quickly determine a target TCI ID regardless of a single-TRP or multi-TRP transmission scenario, thereby ensuring flexibility of TCI information indication without causing additional indication overheads.

It should be understood that, in this application, the first information may be alternatively other information, for example, transmission mode indication information. Any manner obtained through simple extension or simple combination falls within the protection scope of this application. The first information may be indicated by one or more of the first signaling, the second signaling, and the third signaling, or may be indicated by other signaling.

Embodiment 5

This embodiment provides a special indication. A difference from the foregoing embodiments lies in: For a state value of a first field in first signaling in a specific range, a specific spatial relation parameter is indicated as the target spatial relation parameter.

For example, a candidate state value of the first field includes a first range and a second range.

When the state value of the first field is in the first range, the target spatial relation parameter is determined according to the methods in Embodiment 1 to Embodiment 4.

When the state value of the first field is in the second range, it is determined that the target relation parameter is a specified value.

For example, the state value of the first field includes a total of eight states from 000 to 111. The first range includes a total of five states: {000, 001, 010, 011, 100}. The second range includes a total of three states: {101, 110, 111}.

In this case, when the state value of the first field is in the first range, the target spatial relation parameter is determined according to the method in the foregoing embodiments; or when the state value of the first field, for example, "101", is in the second range, the target spatial relation parameter is set to a preset value TCI c4.

In addition, when M=1, the target spatial relation parameter may be alternatively determined by using a method for performing indication through separate setting in this embodiment.

It should be noted that, in the foregoing embodiments, when the UE configures, based on the second information, a correspondence between the first information in the first signaling and one or more spatial relation parameters, for example, a correspondence between a TCI list or a TCI table and information about a CDM group to which a DMRS port belongs, the UE determines, by using the antenna port field, that DMRS port numbers (DMRS port) may be consecutive or inconsecutive. In addition, regardless of whether DMRS port numbers parsed out by the UE based on the antenna port field in the first information are consecutive, the methods in Embodiment 1 to Embodiment 3 may be used to obtain the target spatial relation parameter.

For example, when the UE determines, by using the transport block field, that a current quantity of codewords is 2, the UE may obtain a target TCI ID through parsing according to the method in Embodiment 3. When the quantity of codewords is 1, a quantity of DMRS CDM groups needs to be further determined. If the quantity of DMRS CDM groups is 1 and associated DMRS ports are (0, 1), DMRS port numbers are consecutive. If the quantity of DMRS CDM groups is 2 and associated DMRS ports are (0, 1, x . . . ), (0, 2), or (0, 2, 4, 6), DMRS port numbers are inconsecutive, and a target TCI ID may be determined and obtained according to the "third possible embodiment" in Embodiment 4.

In an embodiment, in addition to indicating a target state value of current DCI signaling, the first field may further include a plurality of other state values, used to directly indicate that the UE uses a specific state value and parse out a TCI ID corresponding to the state value. This manner is mainly used in a scenario in which one TRP corresponds to PDSCH transmission by using a plurality of beams.

In an embodiment, the state value may also be referred to as a state bit.

In an embodiment, the information about the CDM group to which the DMRS port belongs may be a pattern (MU information). When the MU information is used, no NCJT is performed. When the quantity of DMRS CDM groups is greater than a quantity of CDM groups to which DMRS ports belong, no NCJT is performed.

In an embodiment, in the foregoing embodiments, the DMRS port CDM group may be an antenna panel, and a DMRS port CDM group identifier may be a panel ID.

It can be understood that, in the embodiments of this application, the antenna panel may also be referred to as an antenna set, a radio transceiver unit (TXRU or radio transceiver set), an antenna unit, an antenna group, a horizontal antenna set, a vertical antenna set, an antenna element, an antenna port set, or the like. The embodiments of this application are not limited thereto.

Correspondingly, an association relationship between a DMRS port CDM group and at least one TCI ID may be replaced with an association relationship between a panel ID and a TCI ID. It can be understood that a related method for determining a target spatial relation parameter is the same as that in Embodiment 1 to Embodiment 3, and details are not described herein again.

In an embodiment, when the UE includes only one panel, when determining one or more target spatial relation parameters, the UE further needs to determine the one or more target spatial relation parameters based on a quantity of DMRS symbols and information in each piece of signaling. For example, when the quantity of DMRS symbols is 1, if two or more TCI IDs indicate the UE to receive the first channel, because the UE has only one panel, the UE can support only one of the TCI IDs for beam transmission. In a possible determining manner, the UE determines, as the target spatial relation parameter by default, a TCI ID associated with the $1^{st}$ CDM group of all DMRS port CDM groups that is indicated by a TCI state, or a TCI ID associated with a CDM group with a largest quantity of ports in all CDM groups, to receive the first channel.

In the information transmission method provided in the embodiments of this application, for different spatial relation parameter sets, the base station configures different association relationships by using DCI signaling. An example is as follows:

A. The base station configures M spatial relation parameter sets based on second signaling, where M≥1, and the M spatial relation parameter sets include a mapping relationship between one candidate state value of each first field and one or more TCI state IDs.

B. The UE determines a target spatial relation parameter in a first spatial relation parameter based on at least one second field in first signaling, for example, an antenna port field and a transport block field, and a correspondence between the M spatial relation parameter sets and a DMRS port CDM group identifier indicated by the antenna port field.

The target spatial relation parameter includes a TCI state ID, QCL, and the like.

C. One candidate state value of a first field may correspond to one or more spatial relation parameters. For example, a candidate state value 0 corresponds to a TCI a1 (Embodiment 1), or corresponds to TCIs c1 and c9 (Embodiment 2).

D. One value of a DMRS port CDM group identifier corresponds to one spatial relation parameter or spatial relation parameter set. For example, a first value "00" of the DMRS port CDM group corresponds to a TCI list 1 or a TCI table 1, and a second value "01" corresponds to a TCI list 2 or a TCI table 2 (Embodiment 1).

Similarly, an association relationship between a CORESET ID identifier to which the first signaling belongs and a spatial relation parameter or a spatial relation parameter set, and an association relationship between a search space identifier to which the first signaling belongs and a spatial relation parameter or a spatial relation parameter set are further configured by using third signaling, to match a single-TRP or multi-TRP transmission scenario.

E. One codeword may correspond to one spatial relation parameter. For example, a first CW is associated with a TCI ID 1, and a second CW is associated with a TCI ID 2 (Embodiment 4).

In addition, in the foregoing embodiments of this application, single-TRP and single-beam/link transmission may be further supported.

In an embodiment, the target spatial relation parameter in the first spatial relation parameter may be directly or indirectly determined based on q quantity of codewords that is indicated by the transport block field, for example, the three specific embodiments in Embodiment 4. It can be understood that other embodiments may be further included. For example, manners of determining the target spatial relation parameter are different based on different values of the transport block field, different values of the antenna port field, and different values of information indicated by the antenna port field. Various possible manners are not limited in this application.

The following describes an apparatus embodiment corresponding to the foregoing method embodiments.

Figure 9:
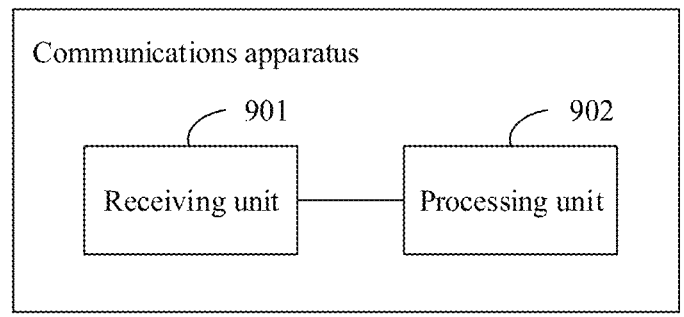
FIG. 9 is a schematic structural diagram of a communications apparatus according to an embodiment of this application.

FIG. 9 is a schematic structural diagram of a communications apparatus according to an embodiment of this application. The apparatus may be a terminal, for example, UE, or a component (for example, a chip) that may be used for a terminal device. Alternatively, the communications apparatus may be a network device, for example, a base station, or a component that may be used for a network device. Further, the communications apparatus may implement a function or an operation of the terminal in the foregoing embodiments, or may implement a function or an operation of the network device in the foregoing embodiments.

As shown in FIG. 9, the communications apparatus may include a receiving unit 901 and a processing unit 902. In an embodiment, the communications apparatus may further include a sending unit, a storage unit, or other necessary units and modules.

In an embodiment, when the communications apparatus is configured to implement an operation or a function corresponding to a terminal, the receiving unit 901 is configured to receive first signaling, and the processing unit 902 is configured to obtain one or more target spatial relation parameters in the first spatial relation parameter, and receive the first channel based on the target spatial relation parameter.

The first signaling includes a first field. A state value of the first field is used to indicate the first spatial relation parameter for receiving the first channel. The state value of the first field is one of a plurality of candidate state values corresponding to the first field. At least one of the plurality of candidate state values corresponds to two or more spatial relation parameters.

In an embodiment, before receiving the first signaling, the receiving unit 901 is further configured to receive second signaling, where the second signaling is used to configure M spatial relation parameter sets, and M≥1. The $i^{th}$ spatial relation parameter set of the M spatial relation parameter sets includes Li spatial relation parameters. There is a correspondence between each of the Li spatial relation parameters and a candidate state value of the first field. 1≤i≤M, Li≥2, and M, i, and Li are all integers.

Further, that the processing unit 902 determines one or more spatial relation parameters in the first spatial relation parameter specifically includes: determining the one or more spatial relation parameters in the first spatial relation parameter based on first information.

The first information is at least one of the following:
at least one second field in the first signaling;
an identifier of a control resource set to which the first signaling belongs;
an identifier of a search space set to which the first signaling belongs;
an antenna panel identifier; and
the state value of the first field.

It should be understood that, in this application, the first information may be alternatively other information, for example, transmission mode indication information. Any manner obtained through simple extension or simple combination falls within the protection scope of this application. The first information may be indicated by one or more of the first signaling, the second signaling, and third signaling, or may be indicated by other signaling.

In an embodiment, the spatial relation parameter includes a TCI state ID, QCL information, an RS, or the like.

In an embodiment, the second field is a transport block field or an antenna port field, the transport block field is used to indicate a quantity of codewords, and the antenna port field is used to indicate at least one DMRS port number.

In an embodiment, the at least one second field in the first signaling includes: A second field in the first signaling is a transport block field, or a second field in the first signaling is an antenna port field, or for two second fields in the first signaling, one second field is a transport block field, and the other second field is an antenna port field.

In an embodiment, that the processing unit 902 determines one or more spatial relation parameters in the first spatial relation parameter based on first information specifically includes: The processing unit 902 determines the one or more spatial relation parameters in the first spatial relation parameter based on second information and the first information. The second information is carried in the third signaling, and the second information is used to configure a correspondence between the first information and the one or more spatial relation parameters.

In an embodiment, the second information may be predefined in a protocol.

Further, the correspondence between the first information and the one or more spatial relation parameters includes any one of the following:
a correspondence between the one or more target spatial relation parameters and a demodulation reference signal DMRS port identifier indicated by the at least one second field in the first signaling;
a correspondence between the one or more target spatial relation parameters and a DMRS port group identifier indicated by the at least one second field in the first signaling, where specifically, the DMRS port group identifier may be an identifier of a CDM group to which a DMRS port belongs;
a correspondence between the one or more target spatial relation parameters and codeword information indicated by the at least one second field in the first signaling;
a correspondence between the one or more target spatial relation parameters and the identifier of the control resource set to which the first signaling belongs; and
a correspondence between the one or more target spatial relation parameters and the identifier of the search space set to which the first signaling belongs.

Alternatively, the correspondence includes a correspondence between the antenna panel identifier and the one or more target spatial relation parameters.

It should be understood that, in this application, the first information may be alternatively other information, for example, transmission mode indication information. Any manner obtained through simple extension or simple combination falls within the protection scope of this application. The first information may be indicated by one or more of the first signaling, the second signaling, and the third signaling, or may be indicated by other signaling.

In an embodiment, the M spatial relation parameter sets include P second spatial relation parameters and Q third spatial relation parameters, there is a correspondence between the P second spatial relation parameters and a first value, and there is a correspondence between the Q third spatial relation parameters and a second value.

The first value and the second value are any one of the following:
the DMRS port number, the identifier of the group to which the DMRS port belongs, or the codeword information that is indicated by the second field;
the identifier of the control resource set;
the identifier of the search space set; and
the antenna panel identifier.

In an embodiment, the first value and the second value may alternatively include the state value of the first field.

In an embodiment, at least one of the M spatial relation parameter sets includes the P second spatial relation parameters; and
at least one of the M spatial relation parameter sets includes the Q third spatial relation parameters; or at least one of the M spatial relation parameter sets includes the P second spatial relation parameters and the Q third spatial relation parameters.

In an embodiment, the first value, the second value, and the third value may all be represented by using binary "0/1", for example, 00.

In an embodiment, the first spatial parameter includes a second spatial parameter and a third spatial relation parameter, and the determining the one or more target spatial relation parameters in the first spatial relation parameter based on first information includes: When the quantity of codewords that is indicated by the second field is 1, the target spatial relation parameter is the second spatial relation parameter or the first spatial relation parameter.

In an embodiment, when the quantity of codewords that is indicated by the second field is 2, the target spatial relation parameter includes the second spatial relation parameter and the third spatial relation parameter; or it is determined, based on a value of the antenna port field in the first signaling, that the target spatial relation parameter is the second spatial relation parameter, or includes the second spatial relation parameter and the third spatial relation parameter, where for a first codeword, the first channel is received based on the second spatial relation parameter, and for a second codeword, the first channel is received based on the third spatial relation parameter; or it is determined, based on the identifier of the group to which the DMRS belongs that is indicated by the antenna port field in the first signaling, that the target spatial relation parameter is the second spatial relation parameter, or includes the second spatial relation parameter and the third spatial relation parameter, where for a first codeword, the first channel is received based on the second spatial relation parameter, and for a second codeword, the first channel is received based on the third spatial relation parameter.

In an embodiment, the spatial relation parameter is a transmission configuration indicator TCI state, quasi-colocation QCL information, or a reference signal RS. The RS is used to indicate QCL information of the first channel.

Figure 10:
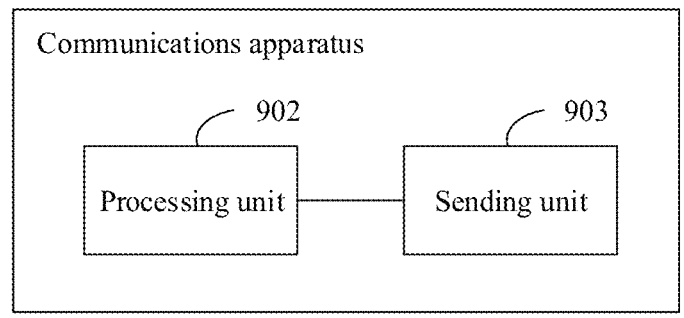
FIG. 10 is a schematic structural diagram of another communications apparatus according to an embodiment of this application.

Referring to FIG. 10, in another embodiment, when the communications apparatus is configured to implement an operation or a function corresponding to a network device (for example, a base station), the communications apparatus further includes a sending unit 903, configured to send first signaling, where the first signaling includes a first field, a state value of the first field is used to indicate a first spatial relation parameter for receiving a first channel, the state value of the first field is one of a plurality of candidate state values corresponding to the first field, and at least one of the plurality of candidate state values corresponds to two or more spatial relation parameters. The sending unit 903 is further configured to send the first channel based on one or more target spatial relation parameters in the first spatial relation parameter.

In an embodiment, the first signaling is DCI signaling.

In an embodiment, the sending unit 903 is further configured to send first information. The first information is used to configure M spatial relation parameter sets, and M≥1. The $i^{th}$ spatial relation parameter set of the M spatial relation parameter sets includes Li spatial relation parameters. There is a correspondence between each of the Li spatial relation parameters and a candidate state value of the first field. $1 \leq i \leq M$, $Li \geq 2$, and M, i, and Li are all integers.

In an embodiment, the second signaling is RRC signaling, or RRC signaling and MAC-CE signaling.

In an embodiment, the sending unit 903 is further configured to send third signaling. The third signaling includes second information, and the second information is used to configure a correspondence between the first information and the one or more spatial relation parameters.

In an embodiment, the third signaling is DCI signaling.

In an embodiment, the third signaling includes the first field.

In an embodiment, the third signaling includes a transport block field, and the transport block field is used to indicate codeword information, for example, a quantity of codewords.

In an embodiment, the third signaling includes an antenna port field, and the antenna port field is used to indicate DMRS port information, for example, a DMRS port number.

It can be understood that, for functions or embodiments of the units and modules of the communications apparatus in this embodiment of this application, reference may be further made to related descriptions in the method embodiments. Details are not described herein again.

Figure 11:
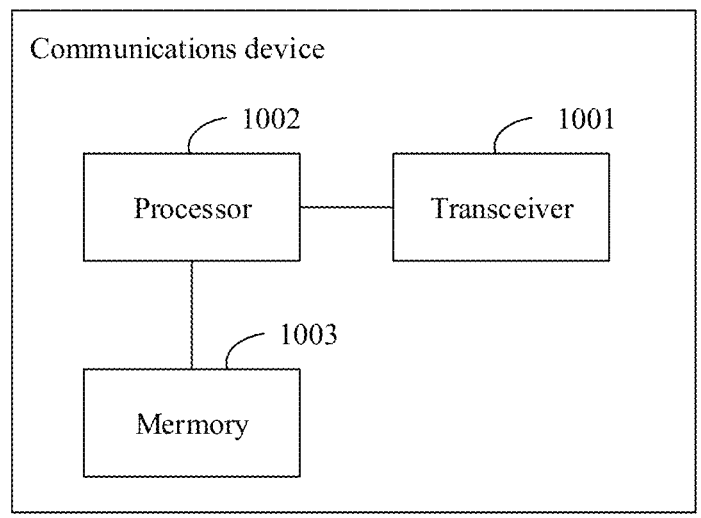
FIG. 11 is a schematic structural diagram of a communications device according to an embodiment of this application.

FIG. 11 is a schematic structural diagram of a communications device according to an embodiment of this application. The communications device may be the terminal device in the foregoing embodiments, or may be a component (for example, a chip) that can be used for the terminal device. The communications device may implement functions or operations of the terminal device in the foregoing embodiments.

Figure 12:
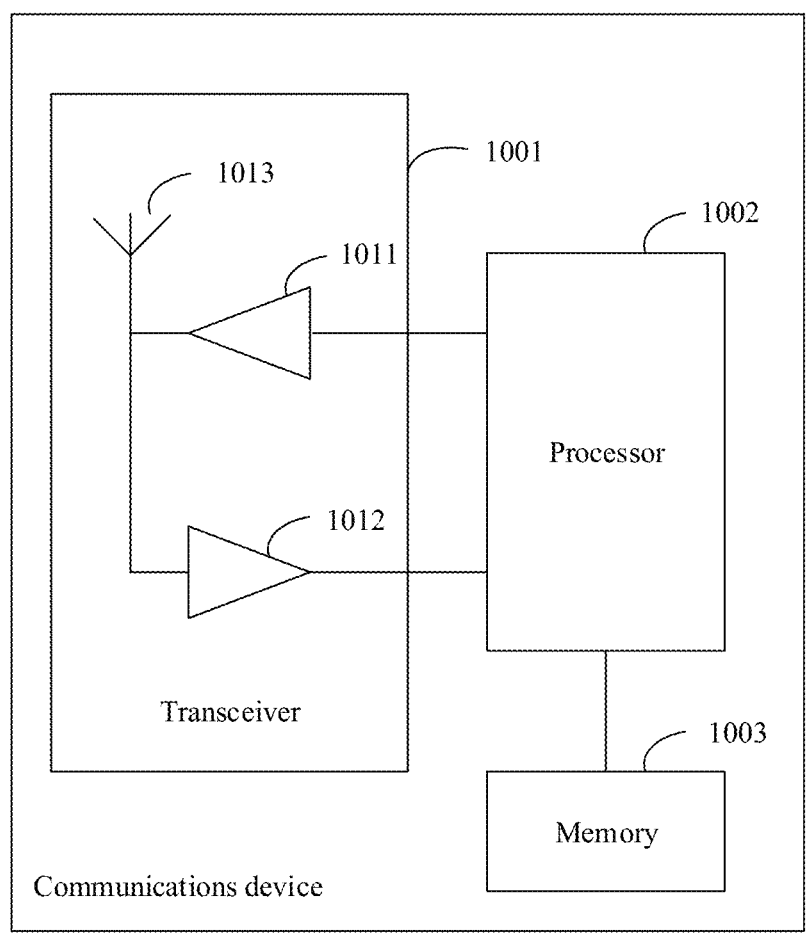
FIG. 12 is a schematic structural diagram of another communications device according to an embodiment of this application.

As shown in FIG. 11, the communications device may include a transceiver 1001 and a processor 1002, and may further include a memory 1003. The memory 1003 may be configured to store code or data. The transceiver 1001 may include components (as shown in FIG. 12) such as a receiver 1011, a transmitter 1012, and an antenna 1013. The communications device may further include more or fewer components, or combine some components, or have different component arrangements. This is not limited in this application.

The processor 1002 is a control center of the communications device, is connected to each part of the entire communications device through various interfaces and lines, and performs various functions of the communications device or processes data by running or executing a software program or a module stored in the memory 1003, and by invoking data stored in the memory 1003.

The processor 1002 may include an integrated circuit (IC), for example, may include a single packaged IC, or may include a plurality of connected packaged ICs with a same function or different functions. For example, the processor 1002 may include only a central processing unit (CPU), or may be a combination of a GPU, a digital signal processor (DSP), and a control chip (for example, a baseband chip) in a transceiver module. In various embodiments of this application, the CPU may be a single computing core, or may include a plurality of computing cores.

The transceiver 1001 is configured to establish a communications channel, so that the communications device is connected to a communications network through the communications channel, to implement communication transmission between the communications device and another device. The transceiver 1001 may be a module that completes receiving and sending functions. For example, the transceiver 1001 may include communications modules such as a wireless local area network (WLAN) module, a Bluetooth module, and a baseband module, and a radio frequency (RF) circuit corresponding to the communications device. The transceiver 1001 is configured to perform communication in a wireless local area network, Bluetooth communication, infrared communication, and/or communication in a cellular communications system, for example, wideband code division multiple access (WCDMA) and/or high speed downlink packet access (HSDPA). The transceiver 1001 is configured to control communication between components in the communications device, and may support direct memory access.

In an embodiment, transceiver modules in the transceiver 1001 are usually presented in a form of an integrated circuit chip, and may be selectively combined, without requiring that all the transceiver modules and corresponding antenna groups are included. For example, the transceiver 1001 may include only a baseband chip, a radio frequency chip, and a corresponding antenna, to provide a communication function in a cellular communications system. The communications apparatus may be connected to a cellular network or an internet through a communication connection, for example, wireless local area network access or WCDMA access, that is established by the transceiver.

In an embodiment, the communications module, for example, the baseband module, in the transceiver 1001 may be integrated into the processor. A typical example is an APQ+MDM series platform provided by Qualcomm. The radio frequency circuit is configured to receive and send a signal in an information receiving or sending process or a call process. For example, after receiving a downlink signal from a network device, the radio frequency circuit sends the downlink signal to the processor to process. In addition, the radio frequency circuit sends uplink data to the network device. Usually, the radio frequency circuit includes a well-known circuit used to perform these functions, including but not limited to an antenna system, a radio frequency transceiver, one or more amplifiers, a tuner, one or more oscillators, a digital signal processor, a codec chipset, a subscriber identity module (SIM) card, a memory, and the like. In addition, the radio frequency circuit may further communicate with a network and another device through wireless communication.

In an embodiment, the transceiver 1001 may be configured to implement all or some of the operations of the information transmission method in the foregoing embodiment. Functions to be implemented by the receiving unit module 901 in FIG. 10 and the sending unit 903 in FIG. 10 may be implemented by the transceiver 1001 of the communications device, or may be implemented by the transceiver 1001 controlled by the processor 1002.

FIG. 11 is a schematic structural diagram of an embodiment of a communications device according to this application. The communications device may be a network device, for example, a base station, or a component (for example, a chip) that may be used for the network device. The communications apparatus may implement functions or operations of the network device in the foregoing embodiments.

The communications device may include a transceiver 1001 and a processor 1002, and may further include a memory 1003. The memory 1003 may be configured to store code or data.

The processor 1002 may be connected to each part of the entire communications device through various interfaces and lines, and perform various functions of the communications device or process data by running or executing a software program or a module stored in the memory, and invoking code or data stored in the memory 1003. The processor 1002 may be a CPU, an NP, or a combination of a CPU and an NP. In an embodiment, the processor 1002 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The memory 1003 may include a volatile memory, for example, a random access memory (RAM), and may further include a non-volatile memory, for example, a flash memory, a hard disk drive (HDD), or a solid-state drive (SSD). The memory 1003 may further include a combination of the foregoing types of memories. The memory may store a program, code, or data, and the processor 1002 in the communications device may implement a function of the communications apparatus by executing the program or the code.

The transceiver 1001 may be configured to receive or send signaling. For example, the transceiver 1001 may send signaling or data to a terminal device or another communications apparatus under control of the processor 1002, or receive a signal or data sent by a terminal device or another communications apparatus.

In an embodiment, the processor 1002 and the transceiver 1001 may be independently exist or may be coupled, to implement all or some of the operations of the communication method in the foregoing method embodiments. For example, when the communications device is used as the network device base station in the foregoing embodiment, the processor 1002 may send first signaling, second signaling, and third signaling, and send, by using the transceiver 1001, the first signaling, the second signaling, and the third signaling that are generated by the processor 1002.

Further, a function to be implemented by the sending unit 903 in FIG. 10 may be implemented by the transceiver 1001 of the communications device, or may be implemented by the transceiver 1001 controlled by the processor 1002, and a function to be implemented by the processing unit 902 may be implemented by the processor 1002.

In an embodiment, this application further provides a computer storage medium. The computer storage medium may store a program, and when the program is executed, some or all of the operations in the embodiments of the information transmission method provided in this application may be performed.

The storage medium may be a magnetic disk, an optical disc, a read-only memory (ROM), a random access memory (RAM), or the like.

In addition, an embodiment of this application further provides a computer program product including an instruction. When the computer program product runs on a computer, the computer is enabled to perform the operations of the information transmission method in the foregoing embodiments.

It may be understood that, all or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape) an optical medium (for example, DVD), a semiconductor medium (for example, a solid-state drive Solid State Disk (SSD)), or the like.

The embodiments in this specification are all described in a progressive manner, for same or similar parts in the embodiments, refer to each other, and each embodiment focuses on a difference from other embodiments. Especially, the system and apparatus embodiments are basically similar to the method embodiments, and therefore are described briefly. For related parts, refer to the descriptions in the method embodiments.

In addition, in the descriptions of this application, "a plurality of" means two or more than two unless otherwise specified. In addition, to clearly describe the technical solutions in the embodiments of this application, terms such as "first", "second", and "third" are used in the embodiments of this application to distinguish between same items or similar items that have a basically same function and purpose. A person skilled in the art may understand that the terms such as "first", "second", and "third" do not constitute a limitation on a quantity or an execution sequence, and the terms such as "first", "second", and "third" do not indicate a definite difference.

The foregoing descriptions are embodiments of this application, but are not intended to limit the protection scope of this application.

The invention claimed is:

1. An apparatus, comprising:
at least one processor; and
a memory to store instructions that, when executed by the at least one processor, cause the at least one processor to:
receive first signaling comprising a first field, wherein a state value of the first field indicates a first spatial relation parameter for receiving a first channel, and wherein the state value of the first field is one of a plurality of candidate state values corresponding to the first field, and at least one of the plurality of candidate state values corresponds to two or more spatial relation parameters;
obtain one or more target spatial relation parameters in the first spatial relation parameter; and
receive the first channel based on the one or more target spatial relation parameters.

2. The apparatus according to claim 1, wherein before the receiving first signaling, the at least one processor is configured to:
receive second signaling used to configure M spatial relation parameter sets, and M≥1, wherein
an $i^{th}$ spatial relation parameter set of the M spatial relation parameter sets comprises Li spatial relation parameters, each of the Li spatial relation parameters corresponding to a candidate state value of the first field, 1≤i≤M, Li≥2, and M, i, and Li are all integers.

3. The apparatus according to claim 1, wherein, to obtain the one or more target spatial relation parameters in the first spatial relation parameter, the at least one processor is configured to:

determine the one or more target spatial relation parameters in the first spatial relation parameter based on first information, wherein
the first information is at least one of the following:
at least one second field in the first signaling;
an identifier of a control resource set to which the first signaling belongs;
an identifier of a search space set to which the first signaling belongs;
the state value of the first field; or
an antenna panel identifier.

4. The apparatus according to claim 3, wherein the second field is an antenna port field.

5. The apparatus according to claim 3, wherein, to determine the one or more target spatial relation parameters in the first spatial relation parameter based on first information, the at least one processor is configured to:
determine the one or more target spatial relation parameters in the first spatial relation parameter based on second information and the first information, wherein
the second information is carried in third signaling, or the second information is predefined in a protocol, and the second information is used to configure a correspondence between the first information and the one or more target spatial relation parameters.

6. The apparatus according to claim 1, wherein the correspondence between first information and the one or more target spatial relation parameters comprises any one of the following:
a correspondence between the one or more target spatial relation parameters and a demodulation reference signal (DMRS) port identifier indicated by at least one second field in the first signaling;
a correspondence between the one or more target spatial relation parameters and an identifier that is indicated by the at least one second field in the first signaling and that is of a group to which a DMRS port belongs;
a correspondence between the one or more target spatial relation parameters and codeword information indicated by the at least one second field in the first signaling;
a correspondence between the one or more target spatial relation parameters and the identifier of a control resource set to which the first signaling belongs;
a correspondence between the one or more target spatial relation parameters and the identifier of a search space set to which the first signaling belongs; or
a correspondence between the one or more target spatial relation parameters and an antenna panel identifier.

7. The apparatus according to claim 1, wherein
when a DMRS CDM group number is a first value, the target spatial relation parameters comprise a second spatial relation parameter; and
when the DMRS CDM group number is a second value, the target spatial relation parameters comprise a third spatial relation parameter.

8. The apparatus according to claim 1, wherein the first spatial relation parameter is a transmission configuration indicator (TCI) status.

9. An apparatus, comprising:
at least one processor; and
a memory to store instructions that, when executed by the at least one processor, cause the at least one processor to:
send first signaling comprising a first field, wherein a state value of the first field indicates a first spatial relation parameter for receiving a first channel, and wherein the state value of the first field is one of a plurality of candidate state values corresponding to the first field, and at least one of the plurality of candidate state values corresponds to two or more spatial relation parameters; and
send the first channel based on one or more target spatial relation parameters in the first spatial relation parameter.

10. The apparatus according to claim 9, wherein the at least one processor is configured to:
send second signaling to configure M spatial relation parameter sets, and M≥1, wherein
an $i^{th}$ spatial relation parameter set of the M spatial relation parameter sets comprises Li spatial relation parameters, each of the Li spatial relation parameters corresponding to a candidate state value of the first field, 1≤i≤M, Li≥2, and M, i, and Li are all integers.

11. The apparatus according to claim 9, wherein the least one processor is configured to:
indicate the one or more target spatial relation parameters using first information, wherein the first information is at least one of the following:
at least one second field in the first signaling;
an identifier of a control resource set to which the first signaling belongs;
an identifier of a search space set to which the first signaling belongs;
the state value of the first field; or
an antenna panel identifier.

12. The apparatus according to claim 11, wherein the second field is an antenna port field.

13. The apparatus according to claim 9, wherein the least one processor is configured to:
send third signaling comprising second information, wherein the second information is used to configure a correspondence between first information and the one or more target spatial relation parameters.

14. The apparatus according to claim 9, wherein the correspondence between first information and the one or more target spatial relation parameters comprises any one of the following:
a correspondence between the one or more target spatial relation parameters and a demodulation reference signal DMRS port identifier indicated by at least one second field in the first signaling;
a correspondence between the one or more target spatial relation parameters and an identifier that is indicated by the at least one second field in the first signaling and that is of a group to which a DMRS port belongs;
a correspondence between the one or more target spatial relation parameters and codeword information indicated by the at least one second field in the first signaling;
a correspondence between the one or more target spatial relation parameters and the identifier of a control resource set to which the first signaling belongs;
a correspondence between the one or more target spatial relation parameters and the identifier of a search space set to which the first signaling belongs; or
a correspondence between one or more target spatial relation parameters and an antenna panel identifier.

15. The apparatus according to claim 9, wherein
when a DMRS CDM group number is a first value, the target spatial relation parameters comprise a second spatial relation parameter; and
when the DMRS CDM group number is a second value, the target spatial relation parameters comprise a third spatial relation parameter.

16. The apparatus according to claim 9, wherein the first spatial relation parameter is a transmission configuration indicator (TCI) status.

17. A non-transitory computer readable storage medium, having instructions stored thereon which, when executed by at least one processor, cause the at least one processor to:
receive first signaling comprising a first field, wherein a state value of the first field indicates a first spatial relation parameter for receiving a first channel, and wherein the state value of the first field is one of a plurality of candidate state values corresponding to the first field, and at least one of the plurality of candidate state values corresponds to two or more spatial relation parameters;
obtain one or more target spatial relation parameters in the first spatial relation parameter; and
receive the first channel based on the one or more target spatial relation parameters.

18. The non-transitory computer readable storage medium according to claim 17, wherein before the receiving first signaling, the at least one processor is configured to:
receive second signaling used to configure M spatial relation parameter sets, and M≥1, wherein
an ith spatial relation parameter set of the M spatial relation parameter sets comprises Li spatial relation parameters, each of the Li spatial relation parameters corresponding to a candidate state value of the first field, 1≤i≤M, Li≥2, and M, i, and Li are all integers.

19. The non-transitory computer readable storage medium according to claim 17, wherein, to obtain the one or more target spatial relation parameters in the first spatial relation parameter, the at least one processor is configured to:
determine the one or more target spatial relation parameters in the first spatial relation parameter based on first information, wherein
the first information is at least one of the following:
at least one second field in the first signaling;
an identifier of a control resource set to which the first signaling belongs;
an identifier of a search space set to which the first signaling belongs;
the state value of the first field; or
an antenna panel identifier.

20. The non-transitory computer readable storage medium according to claim 19, wherein the second field is an antenna port field.

* * * * *